US008489600B2

(12) United States Patent
Hannuksela

(10) Patent No.: US 8,489,600 B2
(45) Date of Patent: Jul. 16, 2013

(54) METHOD AND APPARATUS FOR SEGMENTING AND SUMMARIZING MEDIA CONTENT

(75) Inventor: Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 196 days.

(21) Appl. No.: 12/710,990

(22) Filed: Feb. 23, 2010

(65) Prior Publication Data

US 2011/0208722 A1 Aug. 25, 2011

(51) Int. Cl.
*G06F 7/00* (2006.01)
*G06F 17/30* (2006.01)

(52) U.S. Cl.
USPC ............................................. 707/736

(58) Field of Classification Search
USPC .......................................... 707/736
See application file for complete search history.

(56) References Cited

U.S. PATENT DOCUMENTS

| | | | |
|---|---|---|---|
| 6,516,090 B1 | 2/2003 | Lennon et al. | |
| 7,231,381 B2 | 6/2007 | Li et al. | |
| 7,587,101 B1 | 9/2009 | Bourdev | |
| 7,620,552 B2 | 11/2009 | Rui et al. | |
| 7,680,853 B2 | 3/2010 | Yu et al. | |
| 7,720,773 B2 | 5/2010 | Szummer et al. | |
| 2002/0069218 A1 | 6/2002 | Sull et al. | |
| 2002/0159750 A1 | 10/2002 | Jasinschi et al. | |
| 2002/0161747 A1 | 10/2002 | Li et al. | |
| 2003/0212666 A1 | 11/2003 | Basu et al. | |
| 2003/0217052 A1* | 11/2003 | Rubenczyk et al. | 707/3 |
| 2004/0199494 A1 | 10/2004 | Bhatt | |
| 2005/0114325 A1* | 5/2005 | Liu et al. | 707/3 |
| 2005/0149576 A1* | 7/2005 | Marmaros et al. | 707/200 |
| 2005/0159956 A1* | 7/2005 | Rui et al. | 704/275 |
| 2006/0047701 A1 | 3/2006 | Maybury et al. | |
| 2009/0077137 A1 | 3/2009 | Weda et al. | |
| 2010/0088726 A1* | 4/2010 | Curtis et al. | 725/45 |

FOREIGN PATENT DOCUMENTS

| | | |
|---|---|---|
| WO | WO 2010/014067 A1 | 2/2010 |
| WO | WO 2010/073201 A1 | 7/2010 |

OTHER PUBLICATIONS

International Search Report for corresponding PCT Application No. PCT/FI2011/050042, May 19, 2011, pp. 1-6.
Wang et al., "Video Retrieval and Relevance Feedback in the Context of a Post-Integration Model," IEEE Fourth Workshop on Multimedia Signals, Oct. 3-5, 2001, pp. 33-38.
Written Opinion of the International Searching Authority for corresponding PCT Application No. PCT/FI2011/050042, May 19, 2011, pp. 1-11.

(Continued)

*Primary Examiner* — Charles Lu
(74) *Attorney, Agent, or Firm* — Ditthavong Mori & Steiner P.C.

(57) ABSTRACT

An approach is provided for increasing content relevancy to user search queries by segmenting and summarizing media content. A probabilistic tag application segments a first media content item into at least a first segment and a second segment, associates a first keyword with the first segment, and assigns to the first keyword a first probability value indicating relevance of the first keyword to the first segment. Thereafter, the probabilistic tag application includes the first segment in a search result, in response to a search query including the first keyword.

20 Claims, 17 Drawing Sheets

OTHER PUBLICATIONS

Using a Lightweight Multimedia Content Model for Semantic annotation, Choudhury et al. Accessed on: Oct. 27, 2010, http://www.johnbreslin.org/files/publications/20081023_itt_2008.pdf, pp. 1-8.

Ekin, A. et al., Automatic Soccer Video Analysis and Summarization, IEEE Transactions on Image Processing, vol. 12, No. 7, Jul. 2003. pp. 796-807.

Eronen, A. Chorus Detection with Combined Use of MFCC and Chroma Features and Image Processing Filters, Proc. of the 10th Int. Conference on Digital Audio Effects (DAFx-07), Bordeaux, France, Sep. 10-15, 2007. 8 pages.

* cited by examiner

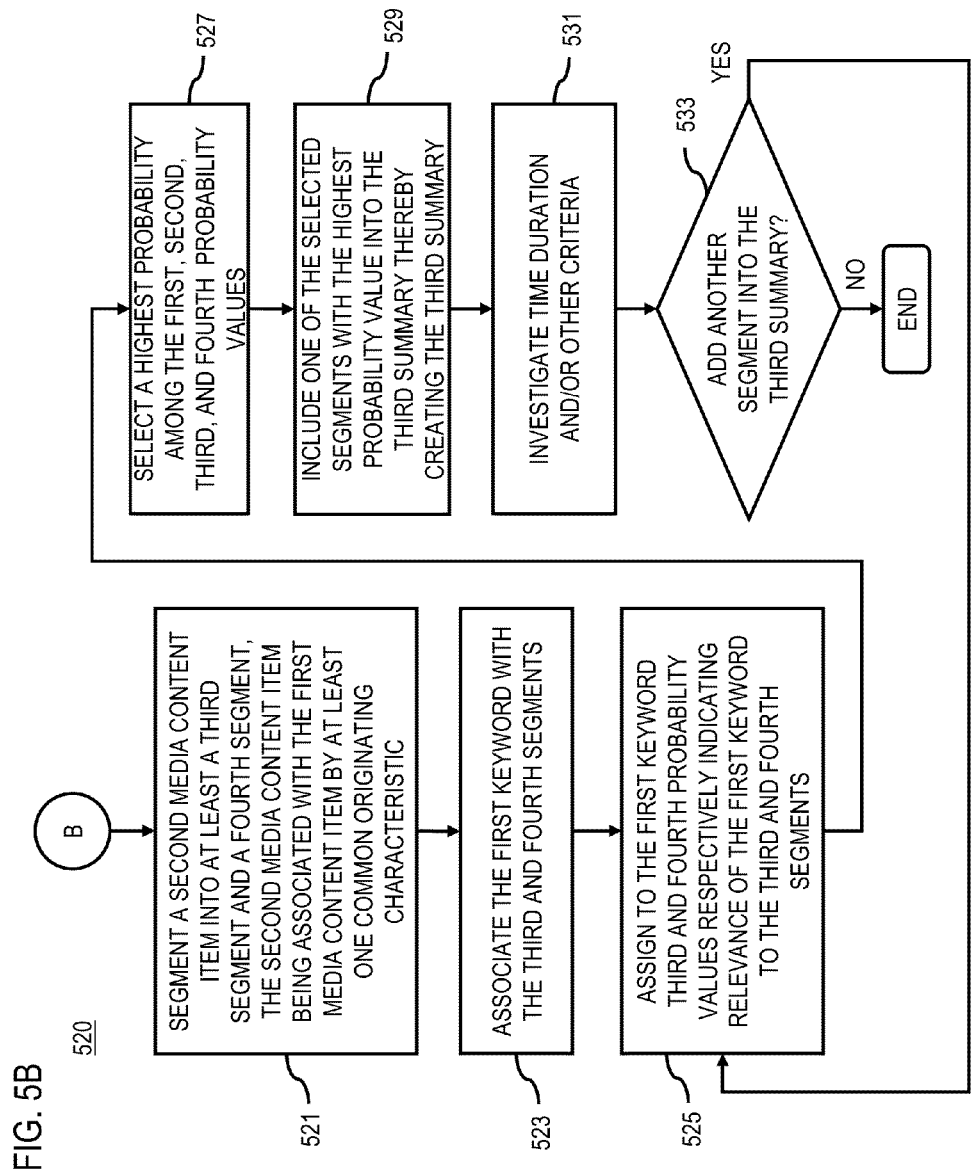

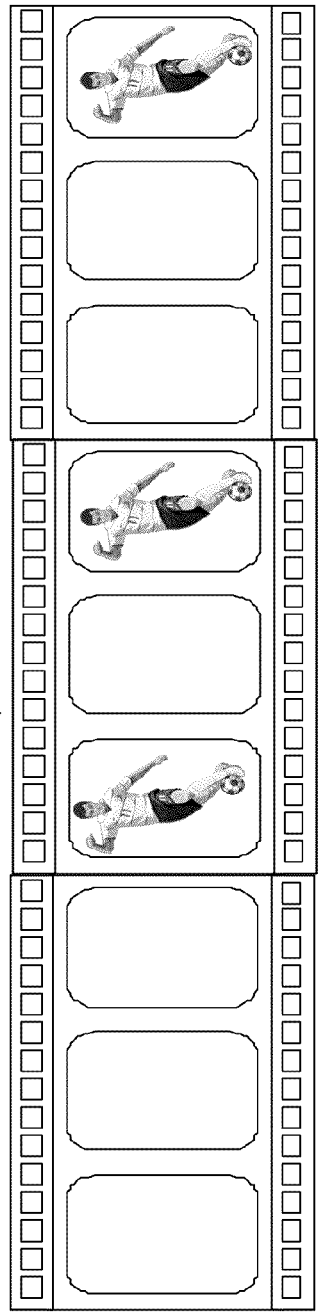
FIG. 6A
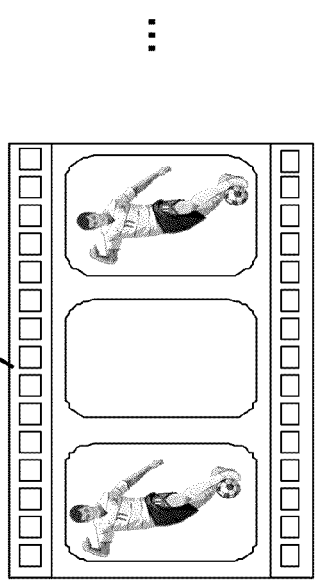
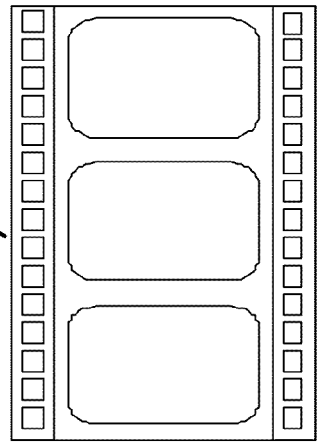
FIG. 6B

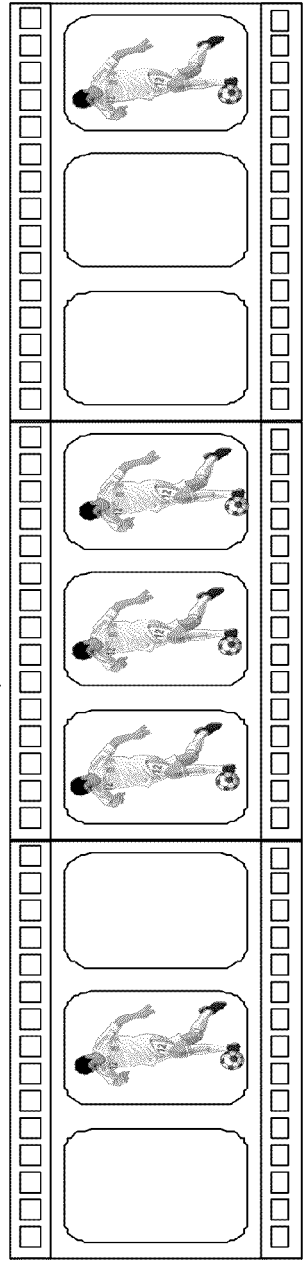
FIG. 6G
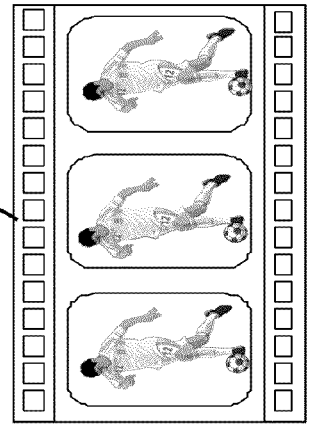
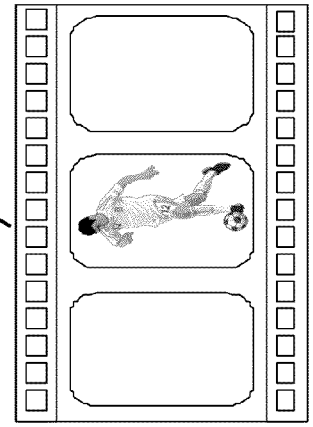
FIG. 6H

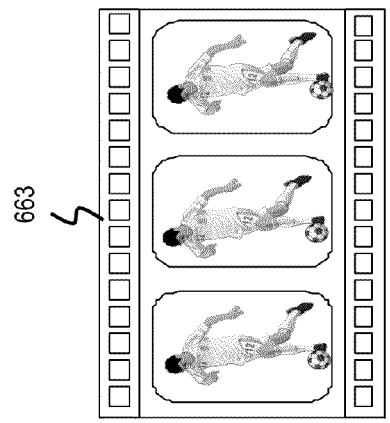
FIG. 6I
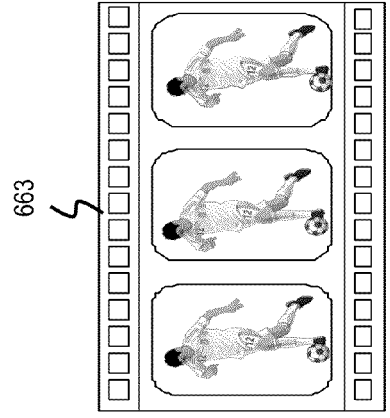
FIG. 6J
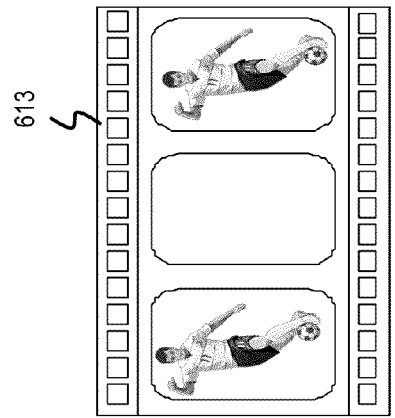
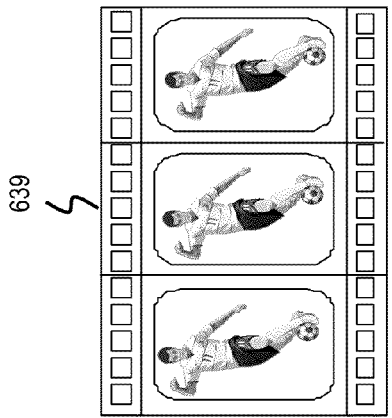

700

METHOD AND APPARATUS FOR SEGMENTING AND SUMMARIZING MEDIA CONTENT

BACKGROUND

Service providers (e.g., wireless, cellular, Internet, content, social network, etc.) and device manufacturers are continually challenged to deliver value and convenience to consumers by, for example, providing efficient media content search services. One area of interest has been in ways to automate media content indexing and sharing services to reduce search response time on existing networks while maintaining a level of search result relevancy acceptable to users. As users continue to increase their reliance on data retrieved from networks, the number of search queries and the results of search queries transmitted increase. Existing search engines and platforms traditionally perform a media content search query using keywords based on, for instance, content analysis algorithms. However, these algorithms often produce results of disorganized media content and/or media content with low/poor relevancy to user interests. Consequently, service providers and device manufacturers face the challenge of providing fast search results of media content items highly relevant to search queries.

SOME EXAMPLE EMBODIMENTS

Therefore, there is a need for an approach for segmenting and summarizing media content.

According to one embodiment, a method comprises segmenting a first media content item into at least a first segment and a second segment. The method also comprises associating a first keyword with the first segment. The method further comprises assigning to the first keyword a first probability value indicating relevance of the first keyword to the first segment. The method further comprises including the first segment in a search result, in response to a search query including the first keyword.

According to another embodiment, an apparatus comprising at least one processor, and at least one memory including computer program code, the at least one memory and the computer program code configured to, with the at least one processor, cause, at least in part, the apparatus to segment a first media content item into at least a first segment and a second segment. The apparatus is also caused to associate a first keyword with the first segment. The apparatus is further caused to assign to the first keyword a first probability value indicating relevance of the first keyword to the first segment. The apparatus is further caused to include the first segment in a search result, in response to a search query including the first keyword.

According to another embodiment, a computer-readable storage medium carrying one or more sequences of one or more instructions which, when executed by one or more processors, cause, at least in part, an apparatus to segment a first media content item into at least a first segment and a second segment. The apparatus is also caused to associate a first keyword with the first segment. The apparatus is further caused to assign to the first keyword a first probability value indicating relevance of the first keyword to the first segment. The apparatus is further caused to include the first segment in a search result, in response to a search query including the first keyword.

According to another embodiment, an apparatus comprises means for segmenting a first media content item into at least a first segment and a second segment. The apparatus also comprises means for associating a first keyword with the first segment. The apparatus further comprises means for assigning to the first keyword a first probability value indicating relevance of the first keyword to the first segment. The apparatus further comprises means for including the first segment in a search result, in response to a search query including the first keyword.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5B are flowcharts of processes for summarizing media content, according to various embodiments;

FIGS. 6A-6J are diagrams of media content items taken from soccer games, according various embodiment;

DESCRIPTION OF SOME EMBODIMENTS

A method and apparatus for segmenting and summarizing media content are disclosed to search for relevant media content items and automatically create a summary of the media content items. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "entity" refers to a unit that has a distinct, separate existence, though it need not be a material existence. Beside legal entities, abstractions and legal fictions are regarded as entities. Entities are also used in system developmental models that display communications and internal processing of documents compared to order processing. An entity may be a person, legal entity, physical object or event, animate or inanimate item, computer code, node, etc.

As used herein, the term "media content" includes any format of information that may provide value for an end-user/audience in specific contexts. By way of example, media content may be in various formats (such as data, images/graphics, audio and video files, web pages/blogs, e-mail messages, etc.) and genres, and delivered via any medium such as the internet, television, audio CDs, etc. Media content formats may be recorded and read by either natural or manufactured mechanisms.

As used herein, the term "probabilistic tag" is a union of a keyword and at least one parameter value indicating the relevance of the keyword. The keyword may be represented using any character set, such as the 16-bit UCS/Unicode Transformation Format (UTF-16). UTF-16 is a variable-length character encoding for Unicode, capable of encoding the entire Unicode repertoire. The encoding form maps each character to a sequence of 16-bit words. Characters are known as code points and the 16-bit words are known as code units.

Figure 1:
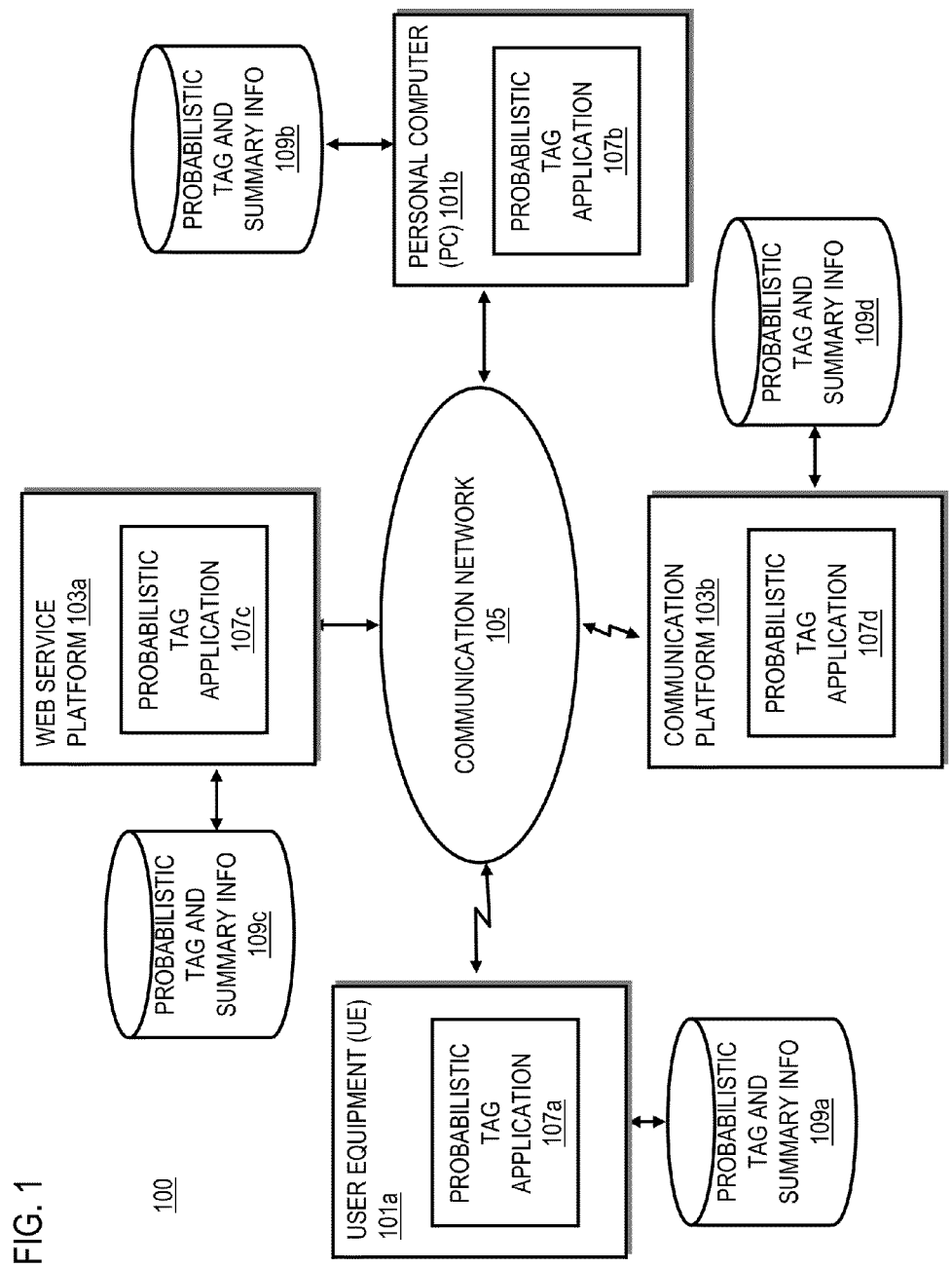
FIG. 1 is a diagram of a system capable of segmenting and summarizing media content, according to one embodiment.

FIG. 1 is a diagram of a system capable of segmenting and summarizing media content, according to one embodiment. As discussed above, the number of online searches for relevant media content is growing. However, existing or traditional techniques of keyword-based webpage and media content indexing and searching do not provide satisfactory results.

To address this problem, a system 100 of FIG. 1 introduces the capability to temporally segment and summarize media content. The system 100 of FIG. 1 recursively segments a piece of media content (i.e., a media content item), assigning a probability tag to one or more segments based upon available metadata, content analysis, or user feedback of the media content item and/or segment, thereby providing a summary for the media content item assembled from one or more of its own segments.

In another embodiment, the system 100 initially assigns a probability tag to a segment based upon available metadata or content analysis of the media content item, and then adjusts a probability value of the probability tag assigned to the segment with user feedback. In yet another embodiment, the system 100 assigns a probability tag to each segment based upon available metadata, content analysis, or user feedback of the media content item and/or segment, and simultaneously providing a summary for the media content item constituted by one or more of its own segments.

More specifically, the system 100 associates a keyword with at least one segment, and assigns a probability value to the keyword indicating the relevance of the keyword to the segment, and then assembles one or more of the segments of high probability values into a summary of the media content item. By way of example, if the keyword is "soccer goal", the corresponding summary can highlight those segments of the media content item that are relevant to a soccer goal (e.g., those segments depicting when a goal is scored). The criteria or keyword for creating this summary can then be applied to other media content items (e.g., footage of other soccer matches) to produce a summary of the other media content items that can highlight and/or determine the relevance of the specified keyword or keywords to the other media items. In this way, different media content items can be quickly and easily summarized using the same keywords.

One significant consideration is to use a user feedback scheme to set and/or adjust a probability tag of each segment. The system 100 stores summaries together with corresponding media content items and segments into a media content database. When receiving a user/entity query for media content items, the system 100 searches among the media content items and the segments to find the relevant media content items and segments, and then presents at least one of the media content items, the searched segments and corresponding summaries to the user/entity. To supplement or enhance the content analysis, searching and browsing actions of the users are used as implicit user feedback for identifying desired media content items and segments later when the users need to find the media content items.

A media content item is analyzed by the system 100 by being segmented temporally, and each of the segments of the media content item is tagged with a keyword and associated with a probability value indicating relevance of the keyword according to at least one of metadata, analysis algorithm, and user feedback. The user feedback is obtained from users' search queries for media content items, while the search queries contain the keywords. A click on a media content item/segment in a search result is used to increase the probability value of the keyword for the segment. A summary of the media content item or a summary of several media content items with respect to the keyword can be created based on the probability values of the segments.

As shown in FIG. 1, the system 100 comprises a user equipment (UE) 101*a* having connectivity to a personal computer 101*b*, a web service platform 103*a* and a communication platform 103*b* via a communication network 105. Each of the UE 101*a*, the personal computer 101*b*, the web service platform 103*a* and the communication platform 103*b* has a probabilistic tag application 107 and a database 109 for storing probabilistic tag and summary information. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101*a*, the personal computer 101*b*, the web service platform 103*a* and the communication platform 103*b* communicate with each other and other components of the communication network 105 using well known, new or still developing protocols. Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
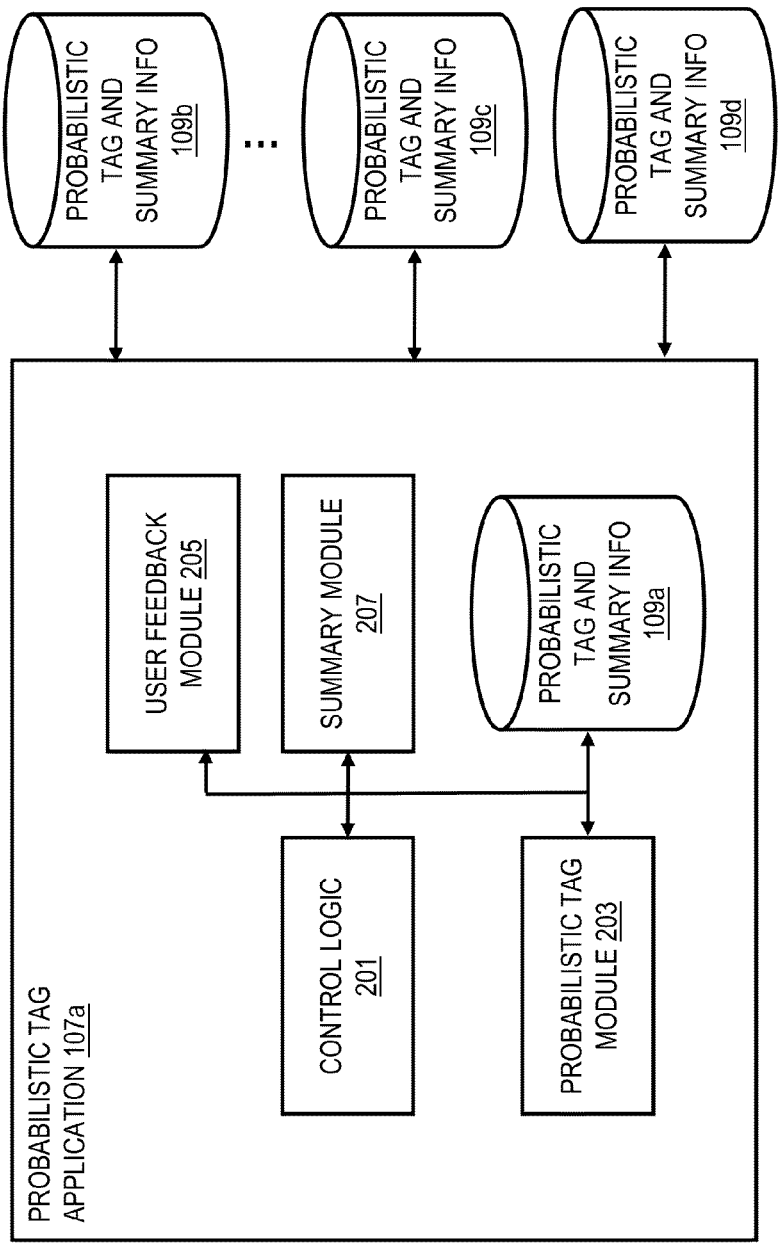
FIG. 2 is a diagram of the components of a probabilistic tag application, according to one embodiment.

FIG. 2 is a diagram of the components of a probabilistic tag application, according to one embodiment. By way of example, the probabilistic tag application 107*a* includes one or more components for segmenting and summarizing media content. In one embodiment, the probabilistic tag application 107*a* is a widget. By way of example, widgets are lightweight applications based on standard web technologies (e.g., web runtime (WRT)—a web application runtime environment included in many browsers), that serve as frontends or clients to web-based or other content and functions. Further, widgets provide a convenient means for presenting information and accessing services. It is contemplated that the functions of these components may be combined in one or more components or performed by other components of equivalent functionality.

In this embodiment, the probabilistic tag application 107*a* includes a control logic 201 for controlling the operation of the probabilistic tag application 107*a*; a probabilistic tag module 203 for generating probabilistic tags for a media content item based upon at least one of metadata, analysis algorithm, and user feedback; a user feedback module 205 for creating or updating the probabilistic tags; a summary module 207 for generating a summary of the media content item or a summary of media content items based upon the probabilistic tags; and the probabilistic tag and summary database 109*a*. The probabilistic tag applications 107*b*, 107*c*, 107*d* have the same or similar features of the probabilistic tag application 107*a*.

Figure 3:
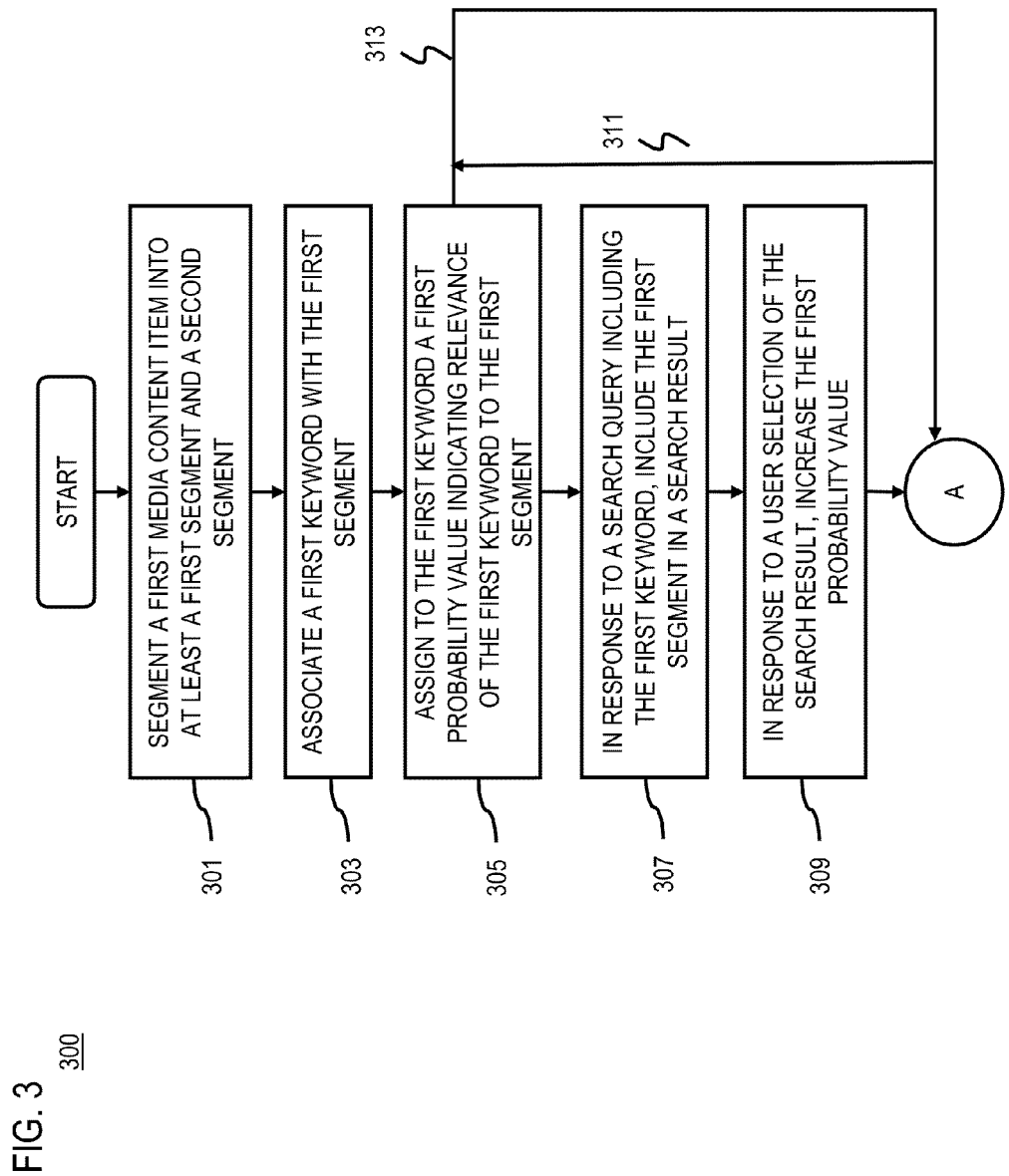
FIG. 3 is a flowchart of a process for segmenting media content, according to one embodiment.
Figure 10:
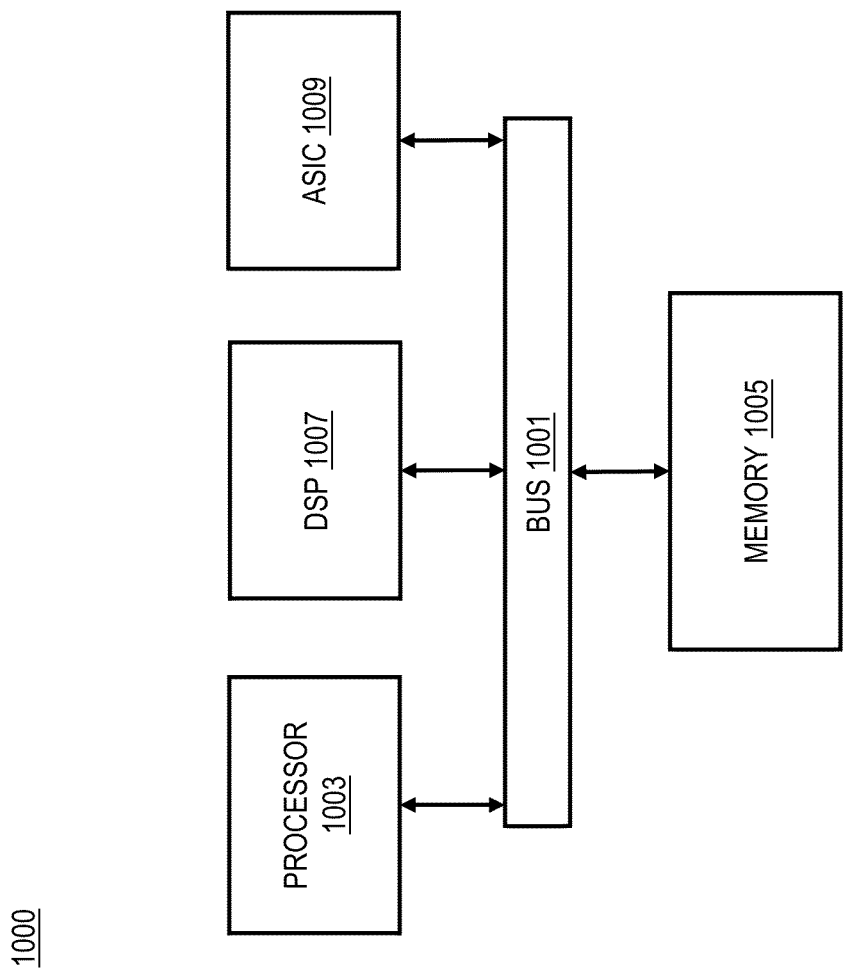
FIG. 10 is a diagram of a chip set that can be used to implement an embodiment of the invention.

FIG. 3 is a flowchart of a process for segmenting media content, according to one embodiment. In one embodiment, the probabilistic tag application 107*a* performs the process 300 and is implemented in, for instance, a chip set including a processor and a memory as shown in FIG. 10. In step 301, the probabilistic tag application 107*a* segments a first media content item (e.g., from a soccer game uploaded to the system 100) into at least a first segment and a second segment. The media content item may be originated from a user (e.g., taken with a camera) or a machine (e.g., synthesized by a computer). The media content item may be received through a communication network or it may be given locally using the same or a different machine. The media content item may include one or more media types, such as audio, video, text, etc. The media item may be tagged and/or time-stamped.

In one embodiment, the probabilistic tag application 107*a* may create any number of segments from the media content. Moreover, the probabilistic tag application 107*a* can perform multiple segmentations according to different criteria, e.g., overlapping segments. In other words, the application 107*a* can segment the same media content into multiple and potentially overlapping series of segments based with each series segmented according to different criteria. A segment of a media content item can be any one or any combination of the following:

The entire media content item.
Any single media type (e.g., text, audio, video, etc.) of the media content item.
A spatial subset of one media type of media content item.
A time-related subset of the media content item.
An object of the media item, the object representing a real-world object (e.g., a person, a tree, a building, etc.) captured in the media content item.
A defined space within a real or virtual 3D world captured (partially) in the media item by a camera view. For example, the spatio-temporal parts of a media content item that covers an area in the 3D world.

Thereafter, the probabilistic tag application 107*a* associates a first keyword (e.g., score) with the first segment (Step 303). Two or more keywords (e.g., score, foul, etc.) may be associated with the same segment to provide probabilistic tags to the segment. Step 303 is an example means of achieving this advantage. The probability values of the tags can be added and applied to the segment. In another embodiment, the keyword is further associated with synonyms (e.g., goal, point, score, etc.) and translations to different languages (e.g., Spanish, Chinese, etc.), when applying the metadata, content analysis, and/or user inputs/feedbacks. There are existing lexical databases of different languages that can be used to retrieve synonyms and translations of the keywords. The keyword may also be associated with or represented by a feature vector indicating its semantics in a certain vocabulary, which may represent a natural language. For example, the keyword may be represented by an index according to an ontology representation. Hereinafter, one keyword is represented as a word and associated with one segment as an example to simplify the discussion even though it is contemplated that multiple keywords may be associated with any one segment.

The association between the first keyword and the first segment may be based upon metadata of the first media content item, content analysis on the first media content item, and/or user inputs/feedbacks. The metadata may be embedded within a media content item or stored in a data repository. The data repository allows bundling metadata for efficient searching. The metadata may include information about when a media content item was created, who created it, when it was last updated, its size and its extension, and the metadata may be created either by a human (e.g., a photographer) or by a machine (e.g., a camera, mobile terminal, computer, etc.). The metadata can be enhanced by further interpretation by a human (e.g., an editor, librarian, researcher, etc.) or a machine with advanced algorithms to include subject, keywords, abstract, etc. By way of example, the available metadata of the soccer game media item can indicate that a second segment of the first media content item contains a scoring event.

As another example, the probabilistic tag application 107*a* applies content analysis on the first media content item and concludes that it has one segment containing a scoring event.

There are video content analysis algorithms specifically designed for soccer games, such as goal detection, referee detection, and penalty-box detection. In addition, generic content analysis algorithms, such as dominant color region detection, robust shot boundary detection, and shot classification (e.g., to close-up and long-shot scenes), can be specifically applied for soccer games. The video content analysis algorithms characterize individual scenes or frames of a media stream, detect a target object or event in the images, to provide a fully automatic and computationally efficient framework for analysis and summarization of soccer videos using cinematic and object-based features. One existing system can output all slow-motion segments in a game, all goals in a game, and slow-motion segments classified according to object-based features of hours of real-time soccer video captured at different countries and conditions. By way of example, the soccer video analysis system can indicate that a second segment of the first media content item contains a scoring event.

For other subject matters, such as music, there are different content analysis algorithms specifically designed for audio content items, such as detecting a chorus section in popular and rock music thereby previewing playlists of the popular and rock music. One existing system utilizes a heuristic scoring scheme to select the initial chorus candidate from the binarized distance matrix, and image processing filters to refine the final position and length of the chorus candidate. The audio sample is processed to extract audio attributes. The analysis comprises extracting audio features such as mel-frequency cepstral coefficients (MFCC). Other audio features, such as MPEG-7 audio features, could be used as well. The audio sample may be temporally segmented to different segments based on the similarity of the audio attributes. The extracted audio attributes of a segment are used as a seed for classification of the segment. The classification is typically done using a model for the signal, the model being represented by essentially the same feature vectors as the audio attributes. The classification is then formed by finding the closest match for the audio attributes from the model. Models have been proposed for different classification of audio signals, such as audio-based environment context recognition, speech recognition, speech/music discrimination, speaker gender or age recognizer, and speaker recognition. The classification then results into one or more keywords indicating the closest match for the segment. The classification algorithm also typically results into a probability of how strong the match of the segment has been compared to the classification result. Such a probability may be used as an initial probability value for the probabilistic tag of the above-described embodiments.

In yet another example, the probabilistic tag application 107a receives a user input/feedback indicating that the third segment contains a scoring event. There are several ways of acquiring user's relevance feedback. For example, the user's relevance feedback may be explicitly assigned by a user or a machine. Alternatively, user's relevance feedback may be implicit as monitored via user interaction (e.g., keyword-based searches and actually browsing of the search results by users) that indicates or confirms a probability tag.

As mentioned, the users of the system 100 may search and browse media content items. The user can enter text search criteria or an image to search for an image or video. As text search criteria, the user may enter one or more keywords that characterize the search. The keywords may be combined with different logical operations (e.g., "and," "or," etc.). The keywords may also be entered in an indirect manner. For example, a media item can be given as a seed for similarity search, and the tags associated with the media item can be used as the keywords to be searched in other media content items. Similar options as presented above for the probabilistic tags exist for the representation of the keywords for search.

The search query may additionally contain other parts, such as further limitations of the search to a certain geographical area (where a media item has been originally created), a certain calendar time (when a media item has been originally captured), certain person/people/company who has originally captured a media item, and a certain genre.

For a search carried out directly from an image, the target image and candidate images are compared against one another by image characteristics, such as metadata, tags, or even their probabilistic tags. Their probabilistic tags may be embedded in the metadata or extracted by analysis algorithms on the fly. At least a part of this processing is based upon matching the combination of keywords given in the search query to those of the probabilistic tags of the media content items matching the other limitations (e.g., person, time, place, etc.) of the search query. The search result should contain segments of the media items whose probabilistic tags at least partially match the keywords of the search query and their logical combination indicated in the search query.

The matching of keywords may also use soft matching techniques, taking into account potential spelling mistakes in the probabilistic tags or the keywords of the search query or both. Furthermore, synonyms, translations, and semantically similar words may be included in the derivation of the search results. Commonly known algorithms, such as latent semantic analysis and its derivations, can be used for retrieving synonyms, translations, and semantically similar words of the keywords. The order of media content items in the search result may be at least partially based on the probability values indicating the relevance of the probabilistic tags. The search result may be represented by various ways, including a key frame or a preview clip summarizing each segment included in the search result.

A user may select one or more of the listed media content items provided in the search result. Instead of or in addition to making such a selection, the user may have other means to indicate the relevance of an item to the search query. For example, a user may give "thumbs up" or "thumbs down" for a media content item in the search query based on its preview clip. The user's selection or other feedback may be considered as implicit relevance feedback related to the keywords of the search query with respect to the selected media content item. In other words, if the user gives "thumbs up" to a media content item and/or selects the media content item in the search result, the keywords of the search query are likely to describe the media content item in the search result. Consequently, the probability value of the respective probabilistic tag can be increased. On the other hand, if the user gives "thumbs down" to a media content item and/or does not select the media content item in the search result, the keywords of the search query probably do not describe the media content item in the search result or its content is otherwise not preferred. Consequently, the probability value of the respective probabilistic tag can be decreased.

In addition to the user's interaction with the media content item search results list, the user's interaction with selected media items themselves can be logged. By way of example, the selection of a media content item typically causes it to be played back on a media player. Media players usually allow non-linear access to the media content item. An end-user may, for example, access the media content item from any desired arbitrary positions in terms of time relative to the beginning of the media content item, fast forward, fast rewind, and play certain parts of the media content item multiple times. The probability of the keywords of the search query being representative may be higher for those parts/segments of the media content item that are played multiple times, played in slow motion, or paused, than those parts/segments of the media content item that are skipped or played in a faster pace. The probability values of the probabilistic tags corresponding to segments of the media content item that are played multiple times, played in slow motion, or paused may be increased, while the probability values of the probabilistic tags corresponding to segments of the media content item that are skipped or played in a faster pace may be decreased. The user's actions in playing a media content item included in the search result are monitored and logged for creating and/or adjusting probabilistic tags. It is noted that in response to the log of user's actions, the segments may be merged or further split. For example, if the user plays the first segment beyond the end of the first segment several times may imply that an event of interest (e.g., a scoring event in the soccer match) extends over the end of the first segment into the second segment where the keyword(s) applied. In this case, the probabilistic tag application 107a merges the first and second segments into one segment or selects the border between the first segment and the second segment again.

The searching, browsing, and playback actions are used as implicit user feedback for identifying desired media content items or segments later when the users need to find the media content items. For example, users can search for the scoring events of a particular soccer match and the probabilistic tags are used to create the search results. Each search result may be represented by a key frame or a preview clip of the temporal segment wherein a goal is scored. A click on a search result is used to increase the probability of the "score" tag for the presented segment. A "scores of the match" summary of the soccer match is created based on the probability value of the "score" tag among the segments of the video clips associated with the soccer match. In yet another embodiment, the feedback of different users is weighted based upon the background of users. For example, the feedback of users of the same social network group for travelling (e.g., people with like-mind as the current user with respect to travelling) as the current user is weighted heavier than those are not.

By way of example, a first segment of the first media content item was browsed by all of the users that clicked the first media content item. The first segment of the first media content item is determined to contain either more scoring events than other segments of the first media content item or at least one scoring event that is preferred to the content of the other segments (which might or might not contain scoring events). The first segment of the first media content item may be any one of the segments of the media content item, instead of the segment first in a time sequence.

The probabilistic tag application 107a assigns to the first keyword a first probability value indicating relevance of the first keyword to the first segment (Step 305). The first probability value is assigned to the first segment based upon at least one of the metadata of the first media content item, content analysis on the first media content item, or user inputs/feedback. For example, the first probability value for a "goal" probabilistic tag is close to zero if the first segment does not contain any scoring event according to content analysis, and the first probability value for a "goal" probabilistic tag is less than but close to one if the first segment contains one scoring event according to content analysis, etc. Alternatively or in addition, a count on user relevance feedback hits may be incorporated into the first probability value.

By way of example, the metadata of the soccer game media item may indicate that the third segment contains a scoring event, such that the probability value of a "goal" probabilistic tag for the third segment is one. As another example, the probabilistic tag application 107a applies content analysis on the first media content item and concludes that the probability value of a "goal" probabilistic tag for the third segment is close to one. In yet another example, the probabilistic tag application 107a receives a user input/feedback indicating that the probability value of the third segment is one.

In response to a search query including the first keyword, the probabilistic tag application 107a may include the first segment in a search result (Step 307). For example, in searching for scoring events in the soccer game of interest, the probabilistic tag application 107a presents all segments of the soccer game media content item in a descending order of probability values, or a predetermined number of segments with higher probability values, or segments with probability values equal to or more than a predetermined value (such as 0.9). Step 307 is an example means of achieving these advantages.

In response to a user selection of the search result, the probabilistic tag application 107a increases the first probability value (Step 309). As mentioned, actually browsing of the search results by a user is taken as a user's feedback that indicates relevance of the segment to the user's query. The increased first probability value in Step 309 is then feed backed to Step 305 as indicted by a feedback path 311 so as to update the results in Step 307. For example, after a user enters a search for scoring events in the soccer game of interest, a media content item that is actually clicked and browsed by the user is assigned with a probability value higher than a media content item that is not clicked and browsed by the user. Since the user may not browse the whole clicked media content item, a segment of the media content item that is actually browsed by the user will be assigned with a probability value higher than another segment of the clicked media content item that is not browsed by the user. Beside user's implicit relevance feedback, the probability value of the segment can also be adjusted based on user's explicit relevance feedback. For example, the user explicitly requests to edit the probability value of the segment.

A segment is adjusted with an increased first probability value, after considering the user feedback. The segment with an adjusted probability value may be promoted to a higher position in the list of all segments of the soccer game media content item, or be inserted into the list of segments passing a minimum probability value threshold.

In the above-described embodiment, the probabilistic tag application 107a executes Steps 305, 307, 309 sequentially. In another embodiment, they are executed in a different order such as 307→305/309. In response to a search query including the first keyword, the probabilistic tag application 107a includes the first segment in a search result. In response to a user selection of the search result, the probabilistic tag application 107a sets a first probability value indicating relevance of the first keyword to the first segment.

In yet another embodiment, the probabilistic tag application 107a executes Steps 307 and 309 in parallel with Step 305. For example, the probabilistic tag application 107a assigns to the first keyword a first probability value indicating relevance of the first keyword to the first segment based upon metadata or content analysis, while iteratively collecting user search terms and selections to adjust the first probability value.

In yet another embodiment, the probabilistic tag application 107a skips Step 307 and Step 309 involving user feedback as indicated by a skipping path 313, and directly proceeds to later processes which will be discussed in detail.

In yet another embodiment, any number of the probabilistic tag applications 107a-107d may operate in collaboration. For example, the probabilistic tag application 107a may perform steps 301, 303, and 305, and the probabilistic tag application 107c may perform steps 307 and 309. In this example, either the first segment and the second segment or the first segmentation indicating at least the first segment and the second segment of the first media content item as well as the first keyword (e.g., score) associated with the first segment, and the first probability value (e.g. 0.9) indicating relevance of the first keyword to the first segment have to be passed from the UE 101a running the probabilistic tag application 107a to the web service platform 103a running the probabilistic tag application 107c. It is noted that there may be any number of UEs 101a, any number of personal computers 101b, any number of web service platforms 103a, and any number of communication platforms 103b, the probabilistic tag applications 107a-d of which collaborate.

In some embodiments, a similarity search may be applied to a newly inserted media content item or its segments, in lieu of assigning the probability value based upon its own metadata, content analysis, and/or user inputs/feedbacks as discussed. Probabilistic tags may be assigned to the media content item or its segments based on tags of one or more similar media content items. The similarity search may be conducted based on metadata, such as the same or similar textual tags, similar year, day and location of shooting a picture, and similar camera settings (e.g., exposure time and focus details). The similarity search may also involve content analysis, and/or user inputs/feedbacks. If the search finds a processed media content item similar to the newly inserted media content item, the existing tags and probability values may be inherited by the newly inserted media content item and/or its segments. The inherited probability values may be scaled or weighted with the estimated strength of the similarity between the media content item. Under some circumstances, the similarity search may consume more time and computation capacities than processing the newly inserted media content item according to the process 300.

As discussed, each of the UE 101a, the personal computer 101b, the web service platform 103a and the communication platform 103b has a probabilistic tag application 107 and a database 109 for storing probabilistic tag and summary information. The stored probabilistic tag and summary information can be transmitted among the UE 101a, the personal computer 101b, the web service platform 103a and the communication platform 103b. By way of example, the probabilistic tag application 107 in another UE (peer-to-peer), the personal computer 101b, the web service platform 103a or the communication platform 103b may receive from the UE 101a: the first media content item (e.g., from a soccer game uploaded to the system 100), the first segmentation indicating at least the first segment and the second segment of the first media content item, the first keyword (e.g., score) associated with the first segment, and the first probability value (e.g. 0.9) indicating relevance of the first keyword to the first segment.

In another embodiment, the first and second segments are received, instead of the first segmentation indicating at least the first segment and the second segment of the first media content item. When receiving the first segmentation (e.g., a time tag marking the position for segmentation), the probabilistic tag application 107 can use the tag to segment the first media content item locally. When directly receiving the first and second segments, the probabilistic tag application 107 does not need to segment the first media content item locally; however, the transmission of the first and second segments consumes network bandwidth.

In yet another embodiment, the receiving side may already have the first media content item such that the sending side does not have to transmit the first media content item. By way of example, the user took the first media content with UE 101a during the soccer game and uploaded the first media content to the personal computer 101b or the web service platform 103a to be analyzed and segmented. When the personal computer 101b or the web service platform 103a finishes the processing, it is not necessary to send the first media content back to the UE 101a.

In one embodiment user equipment, personal computer, or other equipment used to capture media content does not execute any probabilistic tag application. On the contrary, the equipment to capture media content merely captures audio, images, and/or video and then uploads or upstreams the media content item through a communication network or transfers the media content via other means to UE 101a, web service platform 103a, communication platform 103b, or personal computer 101b running a probabilistic tag application 107a-107d. As described earlier, the probabilistic tag application 107a-107d on different devices may also collaborate to perform the process in FIG. 3.

In response to a search query including the first keyword, the probabilistic tag application 107 includes the first segment in a search result as in Step 307 in FIG. 3. In response to a user selection of the search result, probabilistic tag application 107 increases the first probability value as in Step 309 in FIG. 3.

Figure 4:
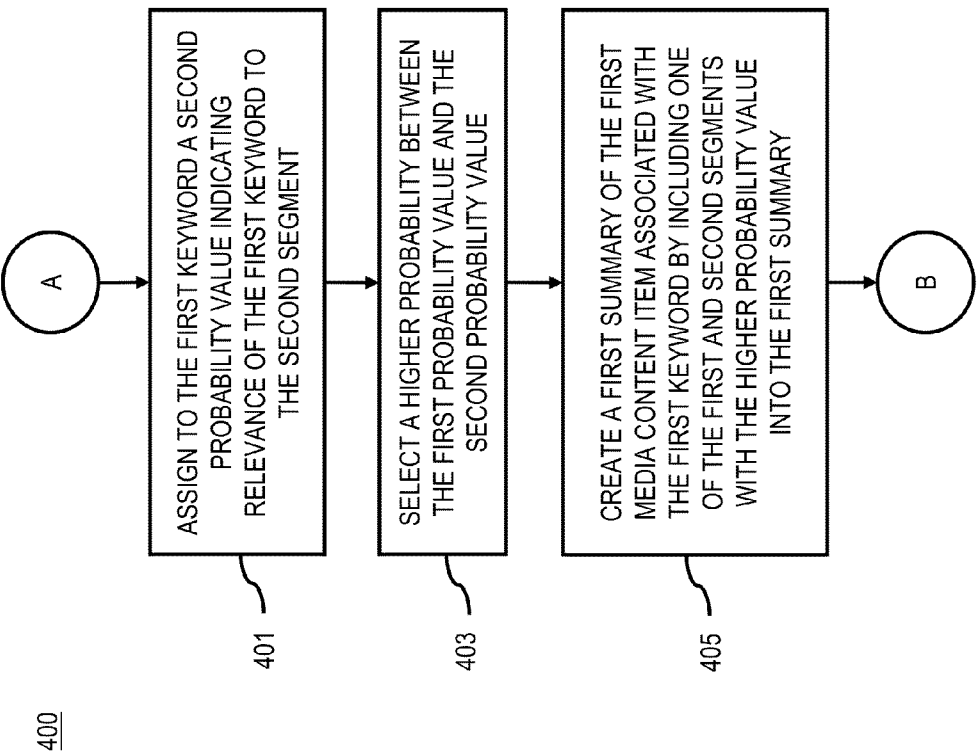
FIG. 4 a flowchart of a process for summarizing media content, according to one embodiment.

FIG. 4 is a flowchart of a process for summarizing media content, according to one embodiment. In one embodiment, the probabilistic tag application 107a performs the process 400 and is implemented in, for instance, a chip set including a processor and a memory as shown in FIG. 10. In step 401, the probabilistic tag application 107a assigns to the first keyword a second probability value indicating relevance of the first keyword to the second segment. Continuing with the soccer game example, the first probability value is zero for a "score" probabilistic tag when the first segment does not contain any scoring event, and the second probability value is one for a "score" probabilistic tag when the second segment contains one scoring event.

The probabilistic tag application 107a selects a higher probability value between the first probability value and the second probability value (Step 403). In this example, the second segment with a probability value of one is selected. The probabilistic tag application 107a creates a first summary of the first media content item associated with the first keyword by including the second segment with the higher probability value into the first summary (Step 405). The first summary is a condensed version of the soccer game media content item with respect to the keyword "score," since it contains only one segment of the media content item. Due to its shorter length, the first summary can also be more relevant to the user's query for "score," than the whole media content item. Step 405 is an example means of achieving this advantage.

In one embodiment, steps 403 and 405 are not performed by the probabilistic tag application 107a, but in a separate application, which need not be executed in the same device as the probabilistic tag application 107a.

As mentioned, updating of the probabilistic tags based on user feedback is optional. Such updating, however, can increase the reliability of determining the relevancy of the content. In another embodiment, the probabilistic tag application 107a compares probability values of the segments adjusted by user feedback that is compiled and incorporated over the course of user searching and browsing events. The user feedback statistics related to the preferred selections over the course of the events are received from a plurality of users. The probabilistic tag application 107a then generates a first summary of the first media content based on the most preferred segment(s) according to the compiled user feedback statistics. Consequently, the user feedback infuses more semantic information into the system 100. In case of a soccer game, for two segments containing the same number of scoring events, one segment has an adjusted probability value higher than the other segment for a "score" probabilistic tag may be a result of different difficulties of the shots, different degrees of popularity of scoring players/teams, etc.

In yet another embodiment, in response to a request for summary, the probabilistic tag application 107a creates or updates a first summary directly based upon existing probabilistic tags in a database created via the process 300. In other words, the probabilistic tag application 107a jump-starts from stored probabilistic tags and media content items to create or update a summary without going through the process 300. The probabilistic tag application 107a takes keywords and additional constraints in the summary request as inputs similarly to processing a search query as previously discussed. The probabilistic tag application 107a creates logical combinations of the keywords to match with existing segments of media content items according to the given requirements of the summary. The matching is done similarly to the matching of the search query to probabilistic tags as previously discussed. The matching results in a plurality of segments ordered in descending matching probability, out of which a subset of segments is selected to be included in the summary. The subset of segments may be determined by one or more of the following constraints:

Total length/duration of the summary.
Whether or not the segments in the summary are allowed to overlap in time, space, or any other dimensions.
A threshold of the degrees of a match to the keywords and their logical combinations.

The segments to be included in the summary may be merged, e.g., by concatenating them one after another, or by including one segment in a picture-in-picture manner on top of another segment. The created summary may be treated as one media content item (i.e., to be associated with probabilistic tags) for responding to a later search query.

Figure 5A:
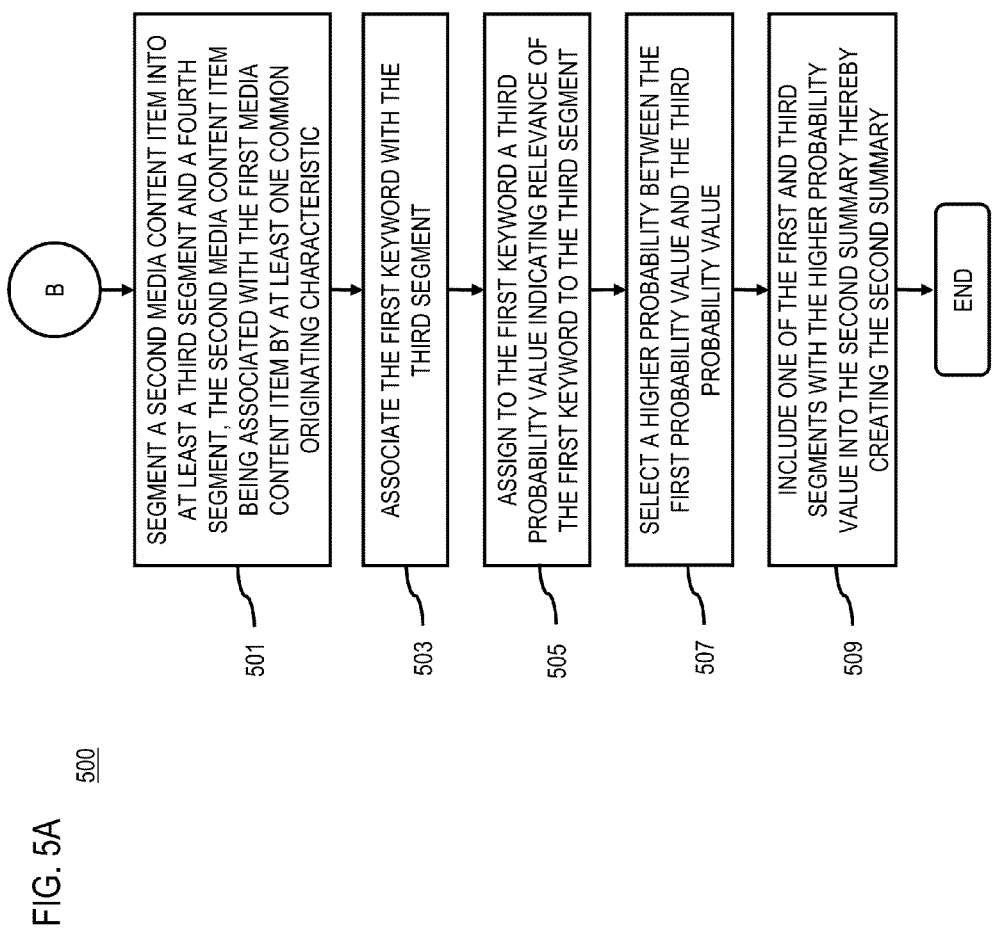

FIG. 5A is a flowchart of a process for summarizing media content, according to another embodiment. In one embodiment, the probabilistic tag application 107a performs the process 500 and is implemented in, for instance, a chip set including a processor and a memory as shown in FIG. 10. In step 501, the probabilistic tag application 107a segments a second media content item (e.g., a video clip of another soccer game of the same league during the same season as the first media content item, etc.) into at least a third segment and a fourth segment. The second media content item being associated with the first media content item by at least one common originating characteristic. The at least one common originating characteristic may include at least one of: originating from an identical event (e.g., the same soccer game, the World Cup, etc.), being captured approximately at an identical location (e.g., the same stadium, the same city, the same country, etc.), being captured approximately at an identical time (e.g., the same hour, day, week, month, season, year, etc.), being captured by an identical person or entity (e.g., the same photographer, the same TV station, the same company, etc.), and being semantically similar (e.g., the same athlete, the same team, the same league, the same sport, etc.). For subject matters other than sports, common originating characteristics may be the top most popular/important songs/movies/news/events/inventions in 2009, the top most visited/beautiful/dangerous cities/websites in world, the top most expensive/economic schools/vehicles/houses/hotels/airlines/restaurants in America, the top most paid/stressful/rewarding jobs in Europe, etc.

In another embodiment, the probabilistic tag application 107a further identifies that the first segment and the third segment represent substantially identical content based on, for instance, detecting that the segments are captured at least at the same location, towards the same direction, and at the same time.

Similar to Steps 303 and 305, the probabilistic tag application 107a associates the first keyword (e.g., score) with the third segment (Step 503), and assigns to the first keyword a third probability value indicating relevance of the first keyword to the third segment (Step 505). The probabilistic tag application 107a then selects a higher probability between the first probability value and the third probability value (Step 507).

The first summary of the second media content item can be created in the process 500 sequentially or in parallel with the first summary of the first media content item created in the processes 300 and 400. The probabilistic tag application 107a includes one of the first segment (i.e., the first summary of the first media content item) and the third segment (i.e., the first summary of the second media content item) that has a higher probability value into the second summary, thereby creating a second summary of the first and second media content items (Step 509).

In one embodiment, steps 507 and 509 are not performed by the probabilistic tag application 107a, but in a separate application, which need not be executed in the same device as the probabilistic tag application 107a.

In another embodiment, the probabilistic tag application 107a incorporates user feedback, that is compiled and incorporated over the course of user searching and browsing events, only at the media content item level. When the first and second media content items were taken from two different soccer games, one game may be more popular than the other game because that the first game involved a champion team of the last year. When the first and second media content items were taken for the same soccer game, they may partially overlap in terms of the capture period. One media content item may be more popular than the other media content item because that the first media content item involved a half-time show or the first media content item was taken from a distance closer to the center of the activities. In either case, the first media content item is adjusted with a higher probability value than the second media content item. The probabilistic tag application 107a may abandon the second media content item and uses only the first media content item to generate summaries. In other words, the probabilistic tag application 107a generates the first summary of the first media content item, and uses it as the second summary of both media content items. As such, the second summary reflects user preferences.

In yet another embodiment, the probabilistic tag application 107a incorporates user feedback, that is compiled and incorporated over the course of user searching and browsing events, only at the segment level. In other words, the probabilistic tag application 107a generates a first summary respectively for the first and second media content items, and then uses the first summary with a higher probability value adjusted by user feedback as the second summary of both media content items. As such, the second summary reflects user preferences as well.

In yet another embodiment, the probabilistic tag application 107a incorporates user feedback at the media content item level as well as at the segment level. Possible scenarios include factoring the adjusted probability values of the media content items into their segments before or after incorporating user feedback at the segment level. Different scenarios may lead to different results depending upon executing sequences and factors of the user preferences. By way of example, the media content items taken by the media/press usually include closer/better views of the event than those taken by the audience. However, the audience members may capture unusual footage missed by the media/press. The audience members that shot the video footage may each upload the video footage to a website or a blog for sharing. For example, such a user generated segment containing the half-time show may have an adjusted probability value higher than a segment with a scoring event taken by another audience member. On the other hand, the value ranking may be reversed if a scoring event segment was taken at a closer shot by the media/press than the half-way show segment taken by an audience member.

FIG. 5B is flowchart of a process for summarizing media content, according to one embodiment. In one embodiment, the probabilistic tag application 107a performs the process 520 and is implemented in, for instance, a chip set including a processor and a memory as shown in FIG. 10. In step 521, the probabilistic tag application 107a segments the second media content item as did in Step 501 of FIG. 5A. Similar to Steps 503 and 505, the probabilistic tag application 107a associates the first keyword (e.g., score) with the third segment and the fourth segment (Step 523), and assigns to the first keyword a third probability value indicating relevance of the first keyword to the third segment and a fourth probability value indicating relevance of the first keyword to the fourth segment (Step 525). The probabilistic tag application 107a then selects the segment having the highest probability value among the first, second, third, and fourth probability values (Step 527). The probabilistic tag application 107a includes the selected segment that has the highest probability value into a third summary (provided that this segment has not been selected as a third summary in the earlier process), thereby creating a third summary of the first and second media content items (Step 529).

In Step 531, the probabilistic tag application 107a investigates the time duration (e.g., 3 minutes long) or other criteria set for the third summary. If the probabilistic tag application 107a determines that another segment can be added to the third summary according to the set time duration or other characteristics of the third summary (Step 533), the process continues back to Step 525. Otherwise, the third summary is considered as complete, and the process 520 ends accordingly.

In one embodiment, steps 527, 529, 531, and 533 are not performed by the probabilistic tag application 107a, but in a separate application, which need not be executed in the same device as the probabilistic tag application 107a.

Figure 6C:
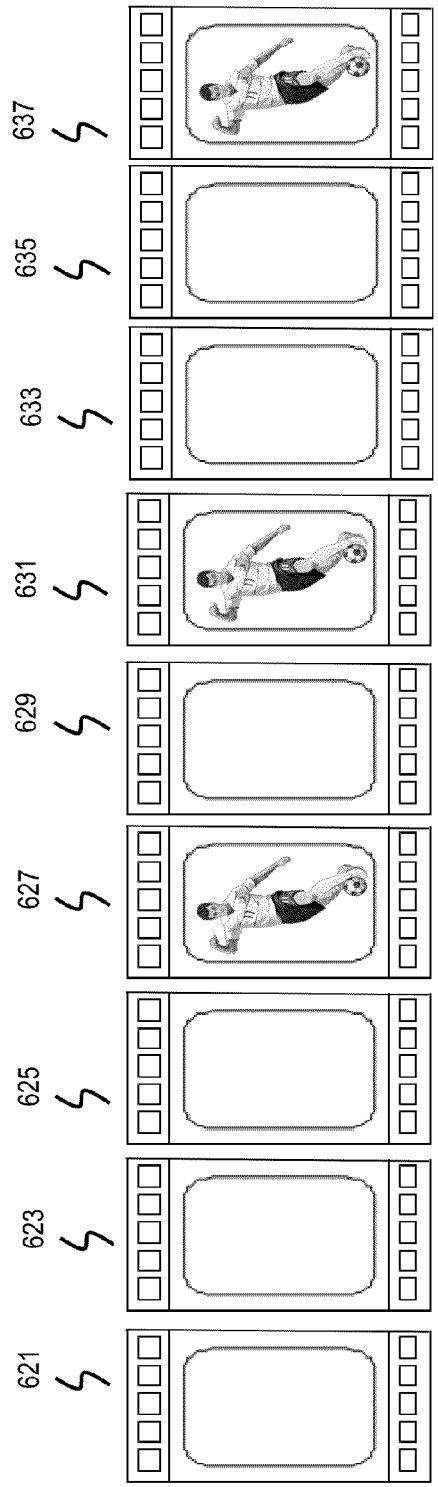

FIGS. 6A-6F are diagrams of a media content item taken for a soccer game, according to one embodiment. By way of example, a user uploads a soccer game media content item 601 of nine-minute long to the system 100 as shown in FIG. 6A. In this embodiment, the soccer game media content item 601 is segmented into three three-minute long segments 611, 613, etc. in FIG. 6B. The segment 611 does not contain any scoring event, the segment 613 contains two scoring events, and the segment 615 contains one scoring event. The three-minute length may be required by viewer preference, broadcasting consideration (commercial breaks, or new clips), etc.

Each of the three-minute long segments 611, 613, etc. may be further segmented into three one-minute long segments 621, 623, 625, 627, 627, 631, 633, 635, 637 as shown in FIG. 6C. The one-minute length may be a heuristic choice (i.e., experience-based, such as a rule of thumb), since most soccer scoring events last for about one minute. As such, the probabilistic tag application 107a may directly segment the soccer game media content item 601 into nine one-minute long segments, rather than segmenting in two stages.

The segmentation may occur recursively for as many times as deemed necessary. By way of example, the user specifies automatic segmentation using 30-second long segments. As such, the probabilistic tag application 107a may directly segment the soccer game media content item 601 into eighteen 30-second long segments, rather than segmenting in several stages.

Figure 6D:
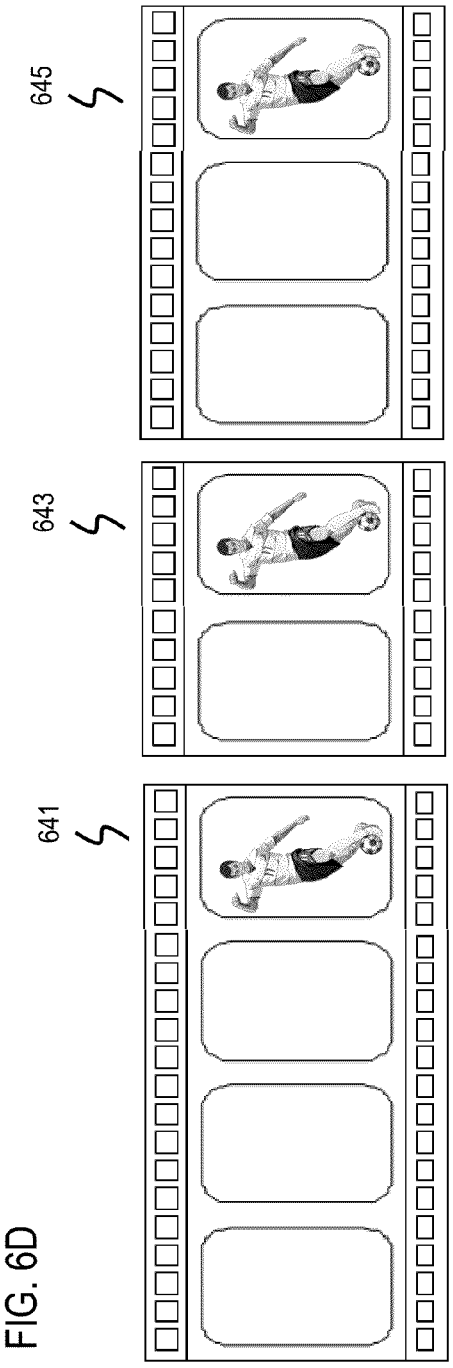

In another embodiment, the segments are not of equal lengths. By way of example, the probabilistic tag application 107a segments the media content item to ensure that each segment contains at least one scoring event. As shown in FIG. 6D, the segment 641 contains one scoring event and is four-minutes long, the segment 643 contains one scoring event and is two-minutes long, and the segment 645 contains one scoring event and is three-minutes long. The probabilistic tag application 107a segments the media content item in any way set by the user, such as into segments of incrementally increasing lengths of 1-minute, 2-minute, 3-minute, etc., or vice versa. Different settings may be beneficial for corresponding kinds of content with respect to keywords of interest. For example, segments of incrementally decreasing lengths can better capture highlights of a firework event or a beauty pageant that gets more intense as getting closer to the end. The segments need not start or end at pre-determined granularity of playback time, such as any full-minute position of the media content item. Scene change detection may be performed for the media content item to determine a change of the scene, such as a switch from one camera to another, a switch from a close-up to a long-shot or vice versa, or a pan from one stable camera direction to another stable camera direction. Segment boundaries may be set to coincide with scene change positions.

Figure 6F:
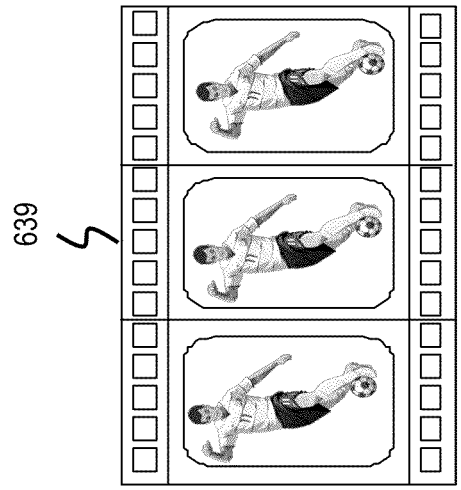
Figure 6E:
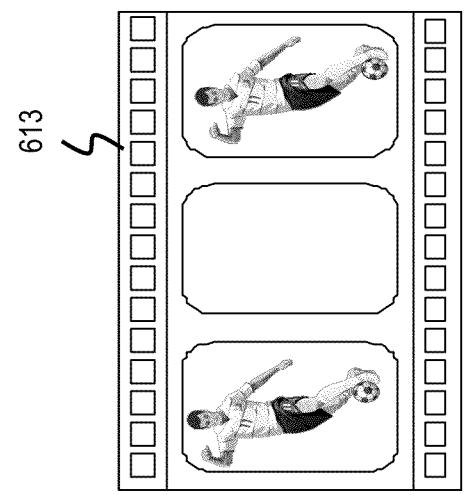

Continuing with the set of segments in FIG. 6B, the probability value for the "score" probabilistic tag of the segment 611 is zero or close to zero when the segment 611 does not contain any scoring event, and the probability value of the segment 613 is one or close to one for the "score" probabilistic tag when the segment 613 contains two scoring events. Since the segment 613 has a higher probability value, it is selected to be included in the first summary of the media content item 601. The first summary 651 in FIG. 6E is a condensed version of the soccer game media content item 601 with respect to the keyword "score," since it contains only one of the 3-minute segment of the media content item 601. Due to its shorter length, the first summary 613 is also more relevant to the user's query for "score," than the media content item 601. Thus these steps are example means for achieving this additional advantage.

In one embodiment, a probabilistic tag includes a count of the events matching the keyword of the tag and at least one probability value for each one of these events. For example, the "score" probabilistic tag for the segment 613 contains a count equal to two and two probability values, one for each detected scoring event within the segment 613, both being one or close to one.

On the hand, as shown in FIG. 6C, the probability value for a "score" probability tag of each of the segments 621, 623, 625, 629, 633, 635 is zero or close to zero since each of these segments does not contain any scoring event. Alternatively, no "score" probability tag for any of the segments 621, 623, 625, 629, 633, 635 is created, as none of these segments contains a scoring event. The probability value of each of the segments 627, 631, 637 is one or close to one, since each of these segments contains one scoring event. Since each of the segments 627, 631, 637 has a higher probability value than the remaining segments, they are selected to be included into another first summary of the media content item 601. The other first summary 639 in FIG. 6F is a combination of the segments 627, 631, 637, which contains three scoring events. The first summary 639 in FIG. 6F is also more relevant to the user's query for "score," than the media content item 601, due to its shorter length yet with the same number of scoring events. Thus these steps are example means for achieving this additional advantage.

FIGS. 6G-6H are diagrams of another media content item from a soccer game, according to one embodiment. For example, there is another/second media content item 651 from a different soccer game uploaded to the system 100 as shown in FIG. 6G. The two soccer games share at least one common originating characteristic. In this example, they are both associated with the World Cup 2008. In this embodiment, the soccer game media content item 651 is segmented into three three-minute long segments 661, 663, etc. in FIG. 6H. The segment 661 contains one scoring event and is assigned with an event count of one and a probability value of one or close to one for a "score" probability tag, and the segment 663 contains three scoring events and is assigned with an event count of three for a "score" probability tag and a probability value of one or close to one for each of these events. Since the segment 663 of the second media content item 651 has an event count of three for a "score" probability tag that is higher than the event count for a "score" probability tag of two other segments of the second media content item 651 as shown in FIG. 6I, the segment 663 is selected as the first summary of the second media content item 651.

FIGS. 6I-6J are diagrams of second summaries of two soccer games, according to one embodiment. Between the first summary 613 of the first media content item 601 and the first summary 663 of the second media content item 651 shown in FIG. 6I, the first summary 663 of the second media content item 651 is included into a second summary of the first and second media content items 601, 651. The second summary 663 of the first and second media content items 601, 651 contains one more scoring event than the first summary 613 of the first media content item 601. On the other hand, between the first summary 639 of the first media content item 601 and the first summary 663 of the second media content item shown in FIG. 6J, either one of the first summary 639 or 663 can be included into a second summary of the first and second media content items 601, 651 since they both contain three scoring events. The selection between the summaries 639, 663 may depend upon a user preference for the soccer games, athletes, etc. Alternatively or in addition, the selection between the first summary 613 of the first media content item 601 and the first summary 663 of the second media content item 651 to be included in the second summary 663 of the first and second media content items 601 may be based on the highest probability value of any scoring events within the first summaries 613, 663 and/or the sum of two or more or all probability values of the scoring events within the first summaries 613, 663.

Figure 6K:
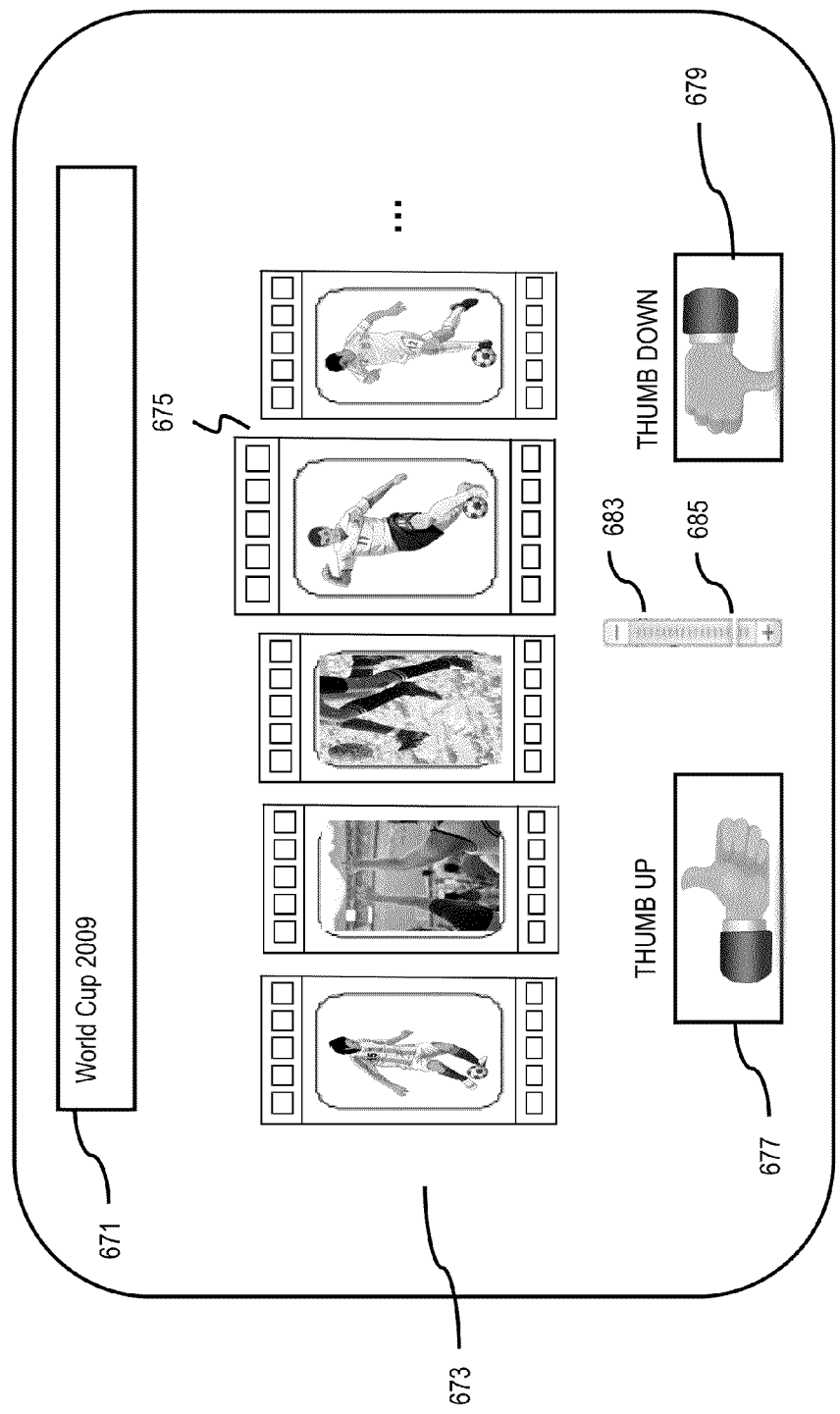
FIG. 6K is diagram of a user interface presenting media content items, according to one embodiment.

FIG. 6K is diagram of a user interface presenting media content items, according to one embodiment. A title bar 671 indicates that the media content items 673 are included in a search results for "World Cup 2009". A user may select one or more of the listed media content items 673 provided in thumbnails as the search result in FIG. 6K, by moving a curser to click on a desired media content item 675. Once the media content item 675 is highlighted and/or enlarged as shown in FIG. 6K, the user may give a "thumbs up" or "thumbs down" for the media content item 675 by clicking the "thumb up" button 677 or the "thumb down" button 679 respectively. In another embodiment, the user can point the cursor to an user interest bar 683 by moving up and down of an interest lever 685 indicate the user's interest with respect to the media content item 675. The user's selection or other feedback may be considered as implicit relevance feedback related to the keywords of the search query with respect to the selected media content item. As discussed, when the user gives "thumbs up" to a media content item and/or selects the media content item in the search result, the keywords of the search query are likely to describe the media content item in the search result. On the other hand, if the user gives "thumbs down" to a media content item and/or does not select the media content item in the search result, the keywords of the search query probably do not describe the media content item in the search result or its content is otherwise not preferred.

Each summary may be represented by a key frame or a preview clip of the temporal segments within each of which a target content occurs. The existing video sharing websites on which users can upload and share videos are flooded with original user-generated video content that has never been edited. More often than not, a viewer realizes the content is not of interest only after spending time viewing it. Although these websites generally prohibit uploading of videos containing defamation, pornography, copyright violations, and material encouraging criminal conduct, many clips on these sites are nonetheless bait and switch type clips (e.g., being claimed and represented as relevant to a topic of interest (e.g., free movie download), but are actually irrelevant or opposite to a topic of interest (e.g., copyright infringement protest)). The above-described embodiments can be offered as features within a video sharing website to generate a summary of one video clip to preview if the clip actually contains the content of interest as claimed. This provides a means for saving battery life and reducing resource use (e.g., computing resources, bandwidth, etc.) on the UE 101 by eliminating the amount of time the user wastes viewing the irrelevant content and re-navigating to the content the user would like to view.

The above-described embodiments can also be triggered within a video sharing website on demand to generate a summary of video clips as a condensed version of the set of video clips, to save viewing time. For example, a user selects a plurality of clips of the same event of different camera views to generate a summary of the same scoring event from different video shooting angles and distances. As another example, the users selects a plurality of clips of different Olympic games to generate a summary of all the scoring events with a length specified by the user (e.g., a 5-minute long summary). These steps provide means for saving battery life on the UE 101 by limiting the amount of time the user would like to view the clips.

The above-described embodiments can also be applied in a video sharing website to monitor user feedback (e.g., times of being actually browsed by users, an averaged rating by browsing users, etc.) and to list video clips satisfied a search query in an order of their user feedback. The user feedback confirms that the clips actually contain a target of interest. By first screening for clips actually containing the represented content of interest then listing the clips by user feedback, the above-described embodiments provide a means for filtering bait-and-switch clips and listing the clips with user feedback, thereby presenting clips with highly relevant content.

The above-described embodiments include three main functional blocks: (1) initial association of probabilistic tags to segments of a media content item; (2) updates of the probabilistic tags based on explicit and/or implicit user feedback; and (3) creation of summaries based on the probabilistic tags. As discussed, these functional blocks can be executed sequentially or in parallel. When executed sequentially, they can be organized in different execution orders. By way of example, the three functional blocks can be executed sequentially by executing the processes 300, 400, 500 in order. In this example, the functional blocks may be executed iteratively on the basis of additional media content items input from the beginning of the process 300, and/or additional user feedback input through Step 309 and the feedback path 311 in FIG. 3.

Figure 7:
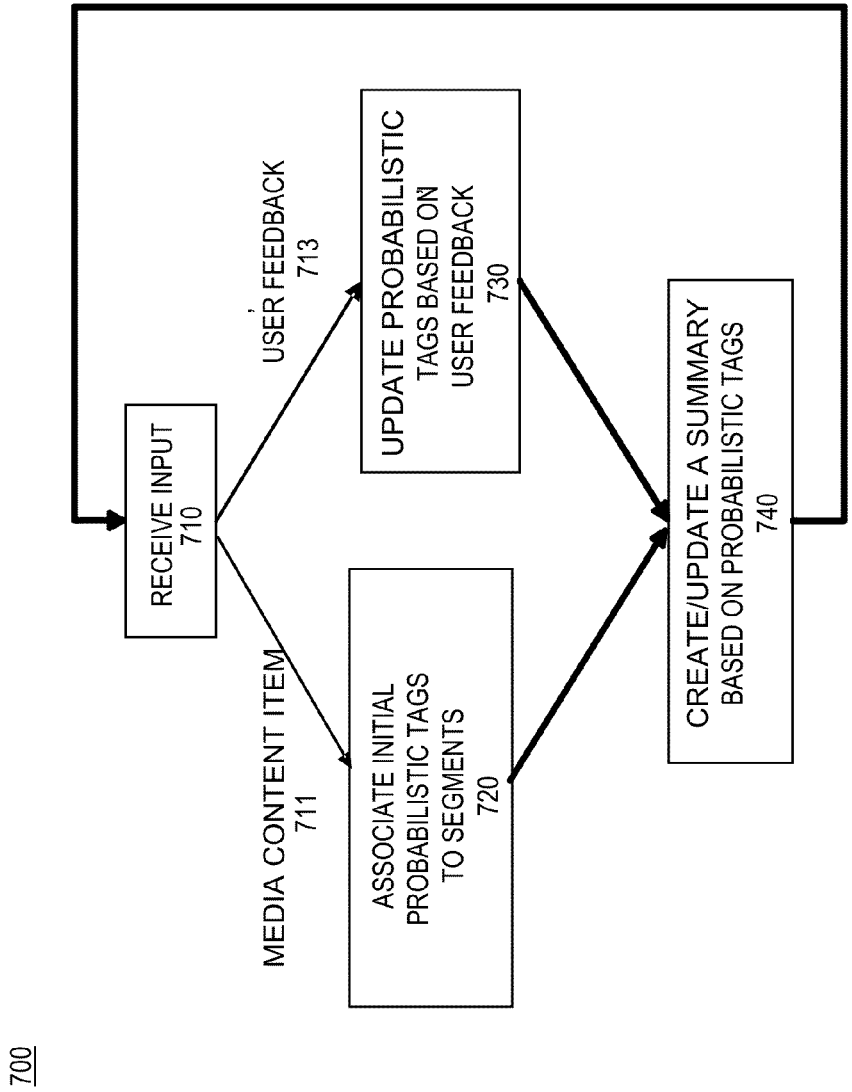
FIG. 7 is a flowchart for handling probabilistic tags in three main functional blocks, according to one embodiment.

FIG. 7 is a flowchart for handling probabilistic tags in three main functional blocks, according to one embodiment. In this embodiment, an initial association functional block operates in parallel with an updating functional block. In the functional block 710, the probabilistic tag application 107a receives different types of input. The input may originate from a user or it may be machine-generated. The input may be received through a communication network or it may be given locally using the same machine.

When the user input includes one or more media content items 711 of one or more media types (e.g., audio, video, text, etc.), the probabilistic tag application 107a associates initial probabilistic tags to segments in a functional block 720 by segmenting one or more the media content items and creating probabilistic tags for the segments as discussed in the process 300 of FIG. 3, Step 401 of FIG. 4, Steps 501, 503, 505 of FIG. 5A, and Steps 521, 523, 525 of FIG. 5B. In another embodiment, the probabilistic tag application 107a may apply multiple segmentations according to different criteria, and the segments can overlap with one another.

When the user input directly includes user feedback 713, the probabilistic tag application 107a updates probabilistic tags based on the user feedback 713 in a functional block 730. The probability values indicating relevance of keywords to segments are updated based on user's explicit or implicit feedback. As discussed, the user feedback may be explicit or implicit. For example, a user may explicitly assign a tag to a segment in a media item. Alternatively, user's relevance feedback may be implicit based on a user interaction that assigns or confirms the association between a tag and a high probability value.

Thereafter, the probabilistic tag application 107a creates a summary of the media content item(s) in a functional block 740 based on either the probabilistic tags created in the functional block 720 as in Steps 403 and 405, or the probabilistic tags updated in the functional block 730 as in Steps 507 and 509. The segments to be included in the summary are merged, e.g., by concatenating them one after each other or by including one segment in a picture-in-picture manner on top of another segment. The created summary may be treated as one media content item (associated with probabilistic tags) for responding to a subsequent search query.

In this embodiment, a summary of a media content item or a summary of media content items is created automatically each time the probabilistic tags of the media content item(s) are created via the functional block 720 or updated via the functional block 730 that operates in parallel with the functional block 720. These steps are example means for achieving this additional advantage.

Figure 8:
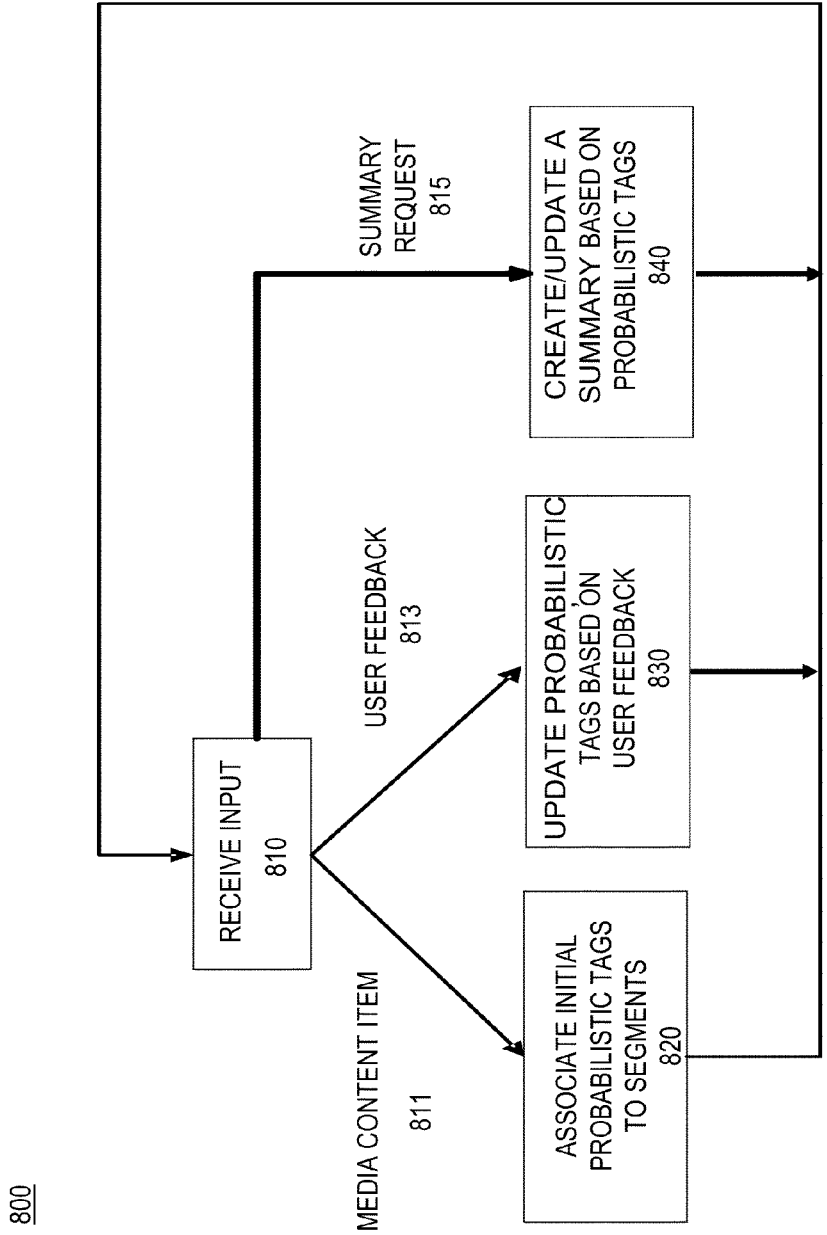
FIG. 8 is a flowchart for handling probabilistic tags in three main functional blocks, according to one embodiment.

FIG. 8 is a flowchart for handling probabilistic tags in three main functional blocks, according to one embodiment. In this embodiment, the summary is created to directly respond to a summary request. The probabilistic tag application 107a receives one or more media content items 811 and user feedback 813 that are similar to the inputs 711 and 713, and executes functional blocks 810, 820, and 830 in the same manner as executing the functional blocks 710, 720, and 730 as discussed. However, the probabilistic tag application 107a executes a functional block 840 in a manner different from executing the functional block 740 as discussed. In particular, the probabilistic tag application 107a creates a summary directly based upon existing probabilistic tags in a database created via the process 300 in response to a summary request 815. In other words, the probabilistic tag application 107a jump-starts from stored probabilistic tags and media content items to create or update a summary without going through the process 300. Thus the functional block 840 is an example means for achieving this additional advantage.

The probabilistic tag application 107a takes keywords, their logical combinations, and additional constraints (e.g., a total length/duration of the summary, whether the segments overlap, etc.) as inputs similarly to search queries. The segments of the media content item(s) are matched to the given constraints of the summary. The matching is done similarly to the matching of the search query to probabilistic tags. The segments to be included in the summary are also merged, and the created summary may be treated as one media content item for responding to a subsequent search query as in the embodiment of FIG. 7.

The above-described embodiments improve the matching accuracy of keywords to segments of media content items and create condensed summaries based upon segments with high probability values. By incorporating explicit and implicit user feedback, the above-described embodiments increase the subjective correspondence of summaries to search queries. For example, a summary of the guitar solos in a rock concert could be requested, and the above-described embodiments significantly improve the likelihood that the presented summary contains the most preferred and relevant views of the guitar solo during the concert.

The processes described herein for segmenting and summarizing media content may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
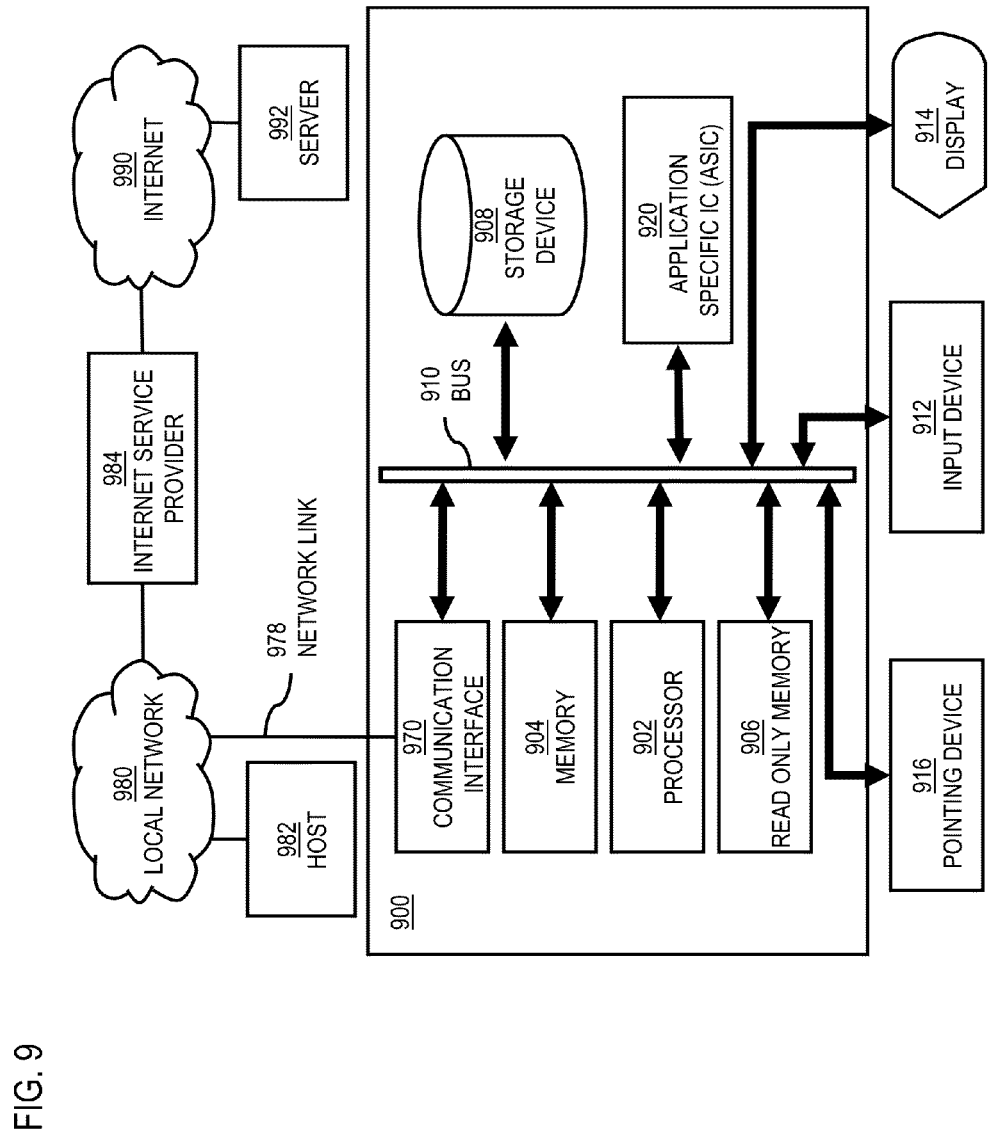
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to segment and summarize media content as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of segmenting and summarizing media content.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to segment and summarize media content. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for segmenting and summarizing media content. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for segmenting and summarizing media content, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medial scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection the UE 101 to the communication network 105 for segmenting and summarizing media content.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to segment and summarize media content as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of services. Chip set or chip 1000, or a portion thereof, constitutes a means for performing one or more steps of segmenting and summarizing media content.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purposed processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to segment and summarize media content. The memory 1005 also stores the data associated with or generated by the execution of the inventive steps.

Figure 11:
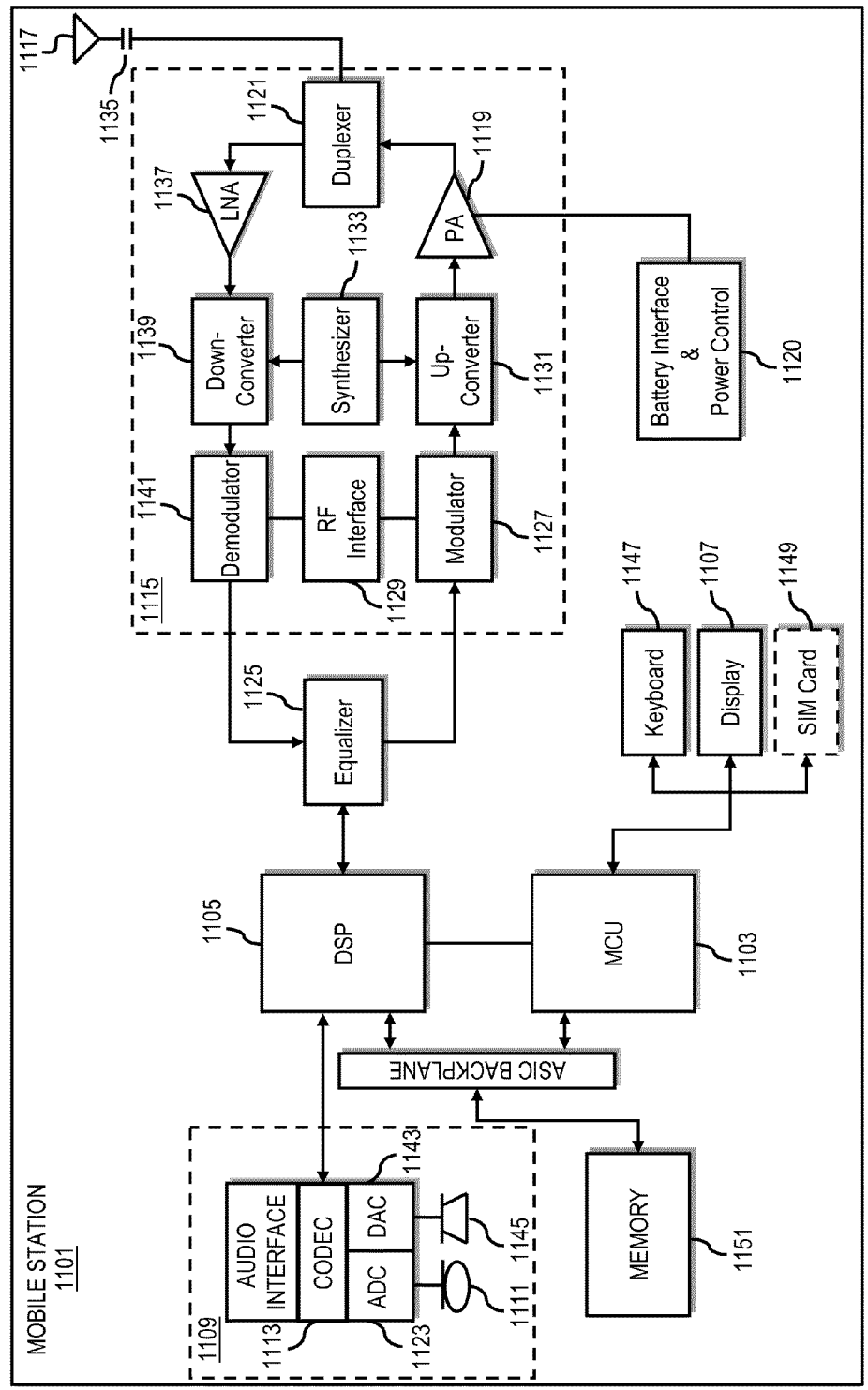
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1100, or a portion thereof, constitutes a means for performing one or more steps of segmenting and summarizing media content. Generally, a radio receiver is often defined in terms of frontend and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of segmenting and summarizing media content. The display 11 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to segment and summarize media content. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    segmenting, by a processor, a first media content item, among a plurality of media content items, into at least a first segment and a second segment;
    associating, by the processor, a first keyword with the first segment;
    assigning, by the processor, to the first keyword a first probability value indicating relevance of the first keyword to the first segment;
    creating, by the processor, a summary of the plurality of media content items, that are provided respectively by a plurality of users and share at least one common originating characteristic, in response to a search query that includes the first keyword,
        wherein the at least one common originating characteristic includes originating from an identical event, being captured at an identical location, being captured approximately at an identical time, being captured by an identical person or entity, or a combination thereof, and
        wherein the summary is provided as a search result and includes the first segment and other segments from other content items based on probability values of the other segments; and
    modifying, by the processor, the segmenting of the first segment based on the probability values of the other segments in the response to the search query.

2. The method of claim 1, further comprising:
    in response to a user selection of the search result, changing the first probability value.

3. The method of claim 1, wherein at least one of the associating and the assigning is based upon at least one of metadata of the first media content item, content analysis on the first media content item, and user inputs.

4. The method of claim 1, further comprising:
    assigning to the first keyword a second probability value indicating relevance of the first keyword to the second segment;
    selecting a higher probability between the first probability value and the second probability value; and
    creating a first summary of the first media content item associated with the first keyword by including one of the first and second segments with the higher probability value into the first summary.

5. The method of claim 1, further comprising:
    segmenting a second media content item into at least a third segment and a fourth segment, the second media content item being associated with the first media content item by the at least one common originating characteristic;
    associating the first keyword with the third segment;
    assigning to the first keyword a third probability value indicating relevance of the first keyword to the third segment; and
    creating a second summary of the first media content item and the second media content item associated with the first keyword based upon the first probability value and the third probability value.

6. The method of claim 5, further comprising:
    identifying that the first segment and the third segment represent identical content;
    selecting a higher probability between the first probability value and the third probability value; and
    including one of the first and third segments with the higher probability value into the second summary to create the second summary.

7. The method of claim 1, further comprising:
    updating the summary based on feedback provided by one or more users, wherein the feedback affects the corresponding probability values.

8. The method of claim 1, further comprising:
    representing the first key word with a feature vector indicating semantics in a vocabulary, an index to an ontology representation, or a combination thereof,
    wherein the summary is generated based, at least in part, on the feature vector, the index, or a combination thereof.

9. The method of claim 1, further comprising:
in response to the search query, retrieving one or more synonyms of the first key word, one or more translations of the first keyword to different languages, or a combination thereof,
wherein the summary is generated based, at least in part, on the one or more synonyms of the first key word, the one or more translations of the first keyword to different languages, or a combination thereof.

10. The method of claim 1, further comprising:
receiving, by the processor, the plurality of media content items that are uploaded respectively by the plurality of users to a media sharing service.

11. An apparatus comprising:
at least one processor; and
at least one memory including computer program code,
wherein the at least one memory and the computer program code configured to, with the at least one processor, cause the apparatus to perform at least the following:
segment a first media content item, among a plurality of media content items, into at least a first segment and a second segment,
associate a first keyword with the first segment,
assign to the first keyword a first probability value indicating relevance of the first keyword to the first segment,
create a summary of the plurality of media content items, that are provided respectively by a plurality of users and share at least one common originating characteristic, in response to a search query that includes the first keyword,
wherein the at least one common originating characteristic includes originating from an identical event, being captured at an identical location, being captured approximately at an identical time, being captured by an identical person or entity, or a combination thereof, and
wherein the summary is provided as a search result and includes the first segment and other segments from other content items based on the probability values of the other segments; and
modifying the segmenting of the first segment based on the probability values of the other segments in the response to the search query.

12. The apparatus of claim 11, wherein at least one of the associating and the assigning is based upon at least one of metadata of the first media content item, content analysis on the first media content item, and user inputs.

13. The apparatus of claim 11, wherein the apparatus is further caused to:
assign to the first keyword a second probability value indicating relevance of the first keyword to the second segment,
select a higher probability between the first probability value and the second probability value, and
create a first summary of the first media content item associated with the first keyword by including one of the first and second segments with the higher probability value into the first summary.

14. The apparatus of claim 11, wherein the apparatus is further caused to:
segment a second media content item into at least a third segment and a fourth segment, the second media content item being associated with the first media content item by the at least one common originating characteristic,
associate the first keyword with the third segment,
assign to the first keyword a third probability value indicating relevance of the first keyword to the third segment, and
create a second summary of the first media content item and the second media content item associated with the first keyword based upon the first probability value and the third probability value.

15. The apparatus of claim 14, wherein the apparatus is further caused to:
identify that the first segment and the third segment represent identical content,
select a higher probability between the first probability value and the third probability value, and
include one of the first and third segments with the higher probability value into the second summary to create the second summary.

16. The apparatus of claim 11, wherein the apparatus is within a user terminal or a server.

17. An apparatus comprising:
at least one processor; and
at least one memory including computer program code,
wherein the at least one memory and the computer program code configured to, with the at least one processor, cause the apparatus to perform at least the following:
receive a first media content item among a plurality of media content items, a first segmentation indicating at least a first segment and a second segment of the first media content item, a first keyword associated with the first segment, and a first probability value indicating relevance of the first keyword to the first segment,
create a summary of the plurality of media content items, that are provided respectively by a plurality of users and share at least one common originating characteristic, in response to a search query that includes the first keyword, wherein the at least one common originating characteristic includes originating from an identical event, being captured at an identical location, being captured approximately at an identical time, being captured by an identical person or entity, or a combination thereof, and wherein the summary is provided as a search result and includes the first segment and other segments from other content items based on the probability values of the other segments, and
in response to a user selection of the search result, change the first probability value, and
modify the segmenting of the first segment based on the probability values of the other segments in the response to the search query.

18. The apparatus of claim 17, wherein the apparatus is further caused to:
assign to the first keyword a second probability value indicating relevance of the first keyword to the second segment,
select a higher probability between the first probability value and the second probability value, and
create a first summary of the first media content item associated with the first keyword by including one of the first and second segments with the higher probability value into the first summary.

19. The apparatus of claim 17, wherein the apparatus is further caused to:
segment a second media content item into at least a third segment and a fourth segment, the second media content item being associated with the first media content item by the at least one common originating characteristic,
associate the first keyword with the third segment, assign to the first keyword a third probability value indicating relevance of the first keyword to the third segment, and create a second summary of the first media content item and the second media content item associated with the first keyword based upon the first probability value and the third probability value.

20. The apparatus of claim 19, wherein the apparatus is further caused to:

identify that the first segment and the third segment represent identical content, select a higher probability between the first probability value and the third probability value, and include one of the first and third segments with the higher probability value into the second summary to create the second summary.

* * * * *